(12) United States Patent
Apel et al.

(10) Patent No.: US 8,510,479 B2
(45) Date of Patent: Aug. 13, 2013

(54) INPUT/OUTPUT DEVICE WITH CONFIGURATION, FAULT ISOLATION AND REDUNDANT FAULT ASSIST FUNCTIONALITY

(75) Inventors: Michael D. Apel, Austin, TX (US);
Steve Dienstbier, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 13/243,203

(22) Filed: Sep. 23, 2011

(65) Prior Publication Data

US 2012/0017122 A1   Jan. 19, 2012

Related U.S. Application Data

(62) Division of application No. 12/646,398, filed on Dec. 23, 2009, now Pat. No. 8,051,220, which is a division of application No. 12/051,548, filed on Mar. 19, 2008, now Pat. No. 7,660,915, which is a division of application No. 09/871,115, filed on May 31, 2001, now Pat. No. 7,370,239.

(51) Int. Cl.
*G06F 11/00* (2006.01)
*G06F 3/00* (2006.01)
*G06F 13/00* (2006.01)

(52) U.S. Cl.
USPC .......... 710/18; 710/15; 710/17; 710/19; 710/100; 714/1; 714/2; 714/3; 714/5.1; 714/43; 714/44; 714/48; 714/100

(58) Field of Classification Search
None
See application file for complete search history.

(56) References Cited

U.S. PATENT DOCUMENTS

| 4,409,552 A | * | 10/1983 | Kompelien | .................... 324/415 |
| 4,984,240 A | | 1/1991 | Keren-Zvi et al. | |
| 5,008,879 A | | 4/1991 | Fischer et al. | |
| 5,136,498 A | | 8/1992 | McLaughlin et al. | |
| 5,202,822 A | | 4/1993 | McLaughlin et al. | |
| 5,235,683 A | * | 8/1993 | Dahlerud | ........................ 710/21 |

(Continued)

FOREIGN PATENT DOCUMENTS

| DE | 199 80 545 T1 | 7/2000 |
| DE | 699 00 228 T2 | 4/2002 |

(Continued)

OTHER PUBLICATIONS

English-language translation and original Notice of Reasons for Rejection for Japanese Patent Application No. 2008-040187, dated Aug. 13, 2010.

(Continued)

*Primary Examiner* — Tanh Nguyen
(74) *Attorney, Agent, or Firm* — Marshall, Gerstein & Borun LLP

(57) ABSTRACT

A process control system is provided having a plurality of I/O devices in communication using a bus. A primary redundant I/O device and a secondary redundant I/O device are coupled to the bus, where the secondary redundant I/O device is programmed to detect a primary redundant I/O device fault. The secondary redundant I/O device, upon detecting the primary redundant I/O device fault, publishes a primary redundant I/O device fault message on the bus. The controller may deactivate the primary redundant I/O device and activate the secondary redundant I/O device responsive to the primary redundant I/O device fault message.

12 Claims, 11 Drawing Sheets

(56) References Cited

U.S. PATENT DOCUMENTS

| | | | |
|---|---|---|---|
| 5,302,947 A | 4/1994 | Fuller et al. | |
| 5,379,278 A | 1/1995 | Safadi | |
| 5,454,111 A * | 9/1995 | Frame et al. | 710/108 |
| 5,748,883 A | 5/1998 | Carlson et al. | |
| 5,777,874 A | 7/1998 | Flood et al. | |
| 5,796,602 A * | 8/1998 | Wellan et al. | 700/1 |
| 5,895,434 A | 4/1999 | Fennel et al. | |
| 5,905,885 A | 5/1999 | Richter et al. | |
| 6,032,203 A | 2/2000 | Heidhues et al. | |
| 6,047,222 A * | 4/2000 | Burns et al. | 700/79 |
| 6,073,193 A | 6/2000 | Yap | |
| 6,108,300 A | 8/2000 | Coile et al. | |
| 6,138,180 A | 10/2000 | Zegelin | |
| 6,182,162 B1 | 1/2001 | Estakhri et al. | |
| 6,218,969 B1 | 4/2001 | Watson et al. | |
| 6,397,277 B1 | 5/2002 | Kato et al. | |
| 6,443,839 B2 | 9/2002 | Stockdale et al. | |
| 6,473,660 B1 * | 10/2002 | Thibault | 700/79 |
| 6,529,505 B1 | 3/2003 | Davis et al. | |
| 6,615,301 B1 | 9/2003 | Lee et al. | |
| 6,618,745 B2 | 9/2003 | Christensen et al. | |
| 6,629,173 B2 | 9/2003 | Iijima et al. | |
| 6,647,452 B1 | 11/2003 | Sonoda et al. | |
| 6,742,136 B2 | 5/2004 | Christensen et al. | |
| 7,370,239 B2 | 5/2008 | Apel et al. | |
| 7,660,915 B2 | 2/2010 | Apel et al. | |
| 7,742,898 B2 * | 6/2010 | Vollmer et al. | 702/185 |
| 8,015,573 B2 | 9/2011 | Apel et al. | |
| 8,051,220 B2 | 11/2011 | Apel et al. | |
| 2002/0055790 A1 * | 5/2002 | Havekost | 700/80 |
| 2002/0133694 A1 | 9/2002 | Ray et al. | |
| 2002/0184410 A1 | 12/2002 | Apel et al. | |
| 2008/0162738 A1 | 7/2008 | Apel et al. | |

FOREIGN PATENT DOCUMENTS

| | | | |
|---|---|---|---|
| EP | 0 096 407 | | 12/1983 |
| EP | 0 472 169 | | 2/1992 |
| EP | 1 014 272 A2 | | 6/2000 |
| GB | 2 339 043 | | 1/2000 |
| JP | 56-035233 | * | 4/1981 |
| JP | 58-176726 | * | 10/1983 |
| JP | 59-111504 | | 6/1984 |
| JP | 62-263554 A | | 11/1987 |
| JP | 01-145701 | | 6/1989 |
| JP | 2-260849 | * | 10/1990 |
| JP | 4-023156 A | | 1/1992 |
| JP | 6-214899 | * | 8/1994 |
| JP | 8-030514 A | | 2/1996 |
| JP | 9-251429 A | | 9/1997 |
| JP | 10-333999 | | 12/1998 |
| JP | 11-098215 | | 4/1999 |
| JP | 11-143616 A | | 5/1999 |
| JP | 11-143790 A | | 5/1999 |
| JP | 11-259325 A | | 9/1999 |
| JP | 2000-183871 A | | 6/2000 |
| JP | 2001-043073 A | | 2/2001 |
| WO | WO-98/14848 A1 | | 4/1998 |

OTHER PUBLICATIONS

English-language translation and original Notice of Reasons for Rejection for Japanese Patent Application No. 2008-040188, dated Aug. 13, 2010.
Examination Report under Section 18(3) issued in GB0212650.6 application by the United Kingdom Patent Office on Jul. 19, 2004.
Examination Report under Sections 17 and 18(3) issued in GB0507937.1 application by the United Kingdom Patent Office on May 23, 2005.
Notice of Reasons for Rejection for Japanese Application No. 2009-015395, mailed Feb. 8, 2011.
Notice of Rejection for Patent Application No. 2002-159877, dated Aug. 21, 2007.
Notice of Rejection for Patent Application No. 2002-159877, dated Mar. 11, 2008.
Office Action for U.S. Appl. No. 09/871,115, dated Mar. 9, 2005.
Office Action for U.S. Appl. No. 09/871,115, dated Aug. 18, 2005.
Office Action for U.S. Appl. No. 09/871,115, dated Mar. 10, 2006.
Office Action for U.S. Appl. No. 09/871,115, dated Oct. 11, 2006.
Office Action for U.S. Appl. No. 09/871,115, dated May 17, 2007.
Office Action for U.S. Appl. No. 12/051,563, dated Mar. 31, 2009.
Office Action for U.S. Appl. No. 12/051,563, dated Dec. 9, 2009.
Office Action for U.S. Appl. No. 12/051,563, dated Mar. 30, 2010.
Office Action for U.S. Appl. No. 12/051,563, dated Dec. 27, 2010.
Office Action for U.S. Appl. No. 12/051,548, dated Oct. 29, 2008.
Office Action for U.S. Appl. No. 12/051,548, dated Apr. 27, 2009.
Office Action for U.S. Appl. No. 12/646,398, dated May 24, 2010.
Office Action for U.S. Appl. No. 12/646,398, dated Nov. 12, 2010.
Search Report under Section 17 issued by the United Kingdom Patent Office on Jan. 20, 2003.
English-language translation of German Office Action for Application No. 102 23 724.7, dated Jun. 12, 2012.

* cited by examiner

INPUT/OUTPUT DEVICE WITH CONFIGURATION, FAULT ISOLATION AND REDUNDANT FAULT ASSIST FUNCTIONALITY

CROSS-REFERENCE TO RELATED APPLICATION

This application is a divisional application of U.S. patent application Ser. No. 12/646,398, entitled "Input/Output Device with configuration, Fault Isolation and Redundant Fault Assist Functionality," filed Dec. 23, 2009 and issued as U.S. Pat. No. 8,051,220 on Nov. 1, 2011, which is a divisional application of U.S. patent application Ser. No. 12/051,548, entitled "Input/Output Device with Configuration, Fault Isolation and Redundant Fault Assist Functionality," filed Mar. 19, 2008 and issued as U.S. Pat. No. 7,660,915 on Feb. 9, 2010, which is a divisional application of U.S. patent application Ser. No. 09/871,115, entitled "Input/Output Device With Configuration, Fault Isolation And Redundant Fault Assist Functionality," filed on May 31, 2001 and issued as U.S. Pat. No. 7,370,239 on May 6, 2008, the entire disclosures of which are hereby expressly incorporated by reference herein.

FIELD OF TECHNOLOGY

The present invention is directed to process control system devices, and more particularly, to an apparatus for and method of implementing configuration, fault isolation, and redundant fault assist control of input/output devices used in a process control system.

DESCRIPTION OF THE RELATED ART

Large processes such as chemical, petroleum, and other manufacturing and refining processes include numerous field devices disposed at various locations to measure and control parameters of the process to thereby effect control of the process. These field devices may be, for example, sensors such as temperature, pressure, and flow rate sensors as well as control elements such as valves and switches.

Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of a DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices in performing other control functions. To implement these control functions, each process control device includes a microprocessor capable of performing one or more control functions as well as communicating with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process. Further, within a particular communication protocol, for example the Fieldbus protocol, different versions may exist, providing varying levels of functionality for the process control system within the particular protocol.

The bus connecting the devices of the process control system includes different sections, or segments, which are separated by bridge devices, such as controllers. Each segment interconnects a subset of the devices attached to the bus to enable communications between the devices during control of processes. The controllers typically communicate with the field devices on the segments via input/output (I/O) devices. The I/O devices implement the particular communications protocol used in the process control network, and control the communications between the controllers and the devices on the segments. Communication between the I/O devices and the controller may be accomplished using any I/O communication protocol including proprietary communication protocols or a standard communication protocol. The I/O communication protocol encompasses any communication protocol and format of data fields within the communication protocol used to communicate information between a controller and I/O devices linked with the controller. For example, the I/O communication protocol may include a standard communication protocol such as the Railbus protocol for transmitting information between the controller and the I/O devices, with the information placed in data fields of the Railbus protocol in a format specific to the controller and I/O device manufacturer. The communication protocol used for communications between the controller and the I/O devices may also come in multiple versions, providing varying levels of functionality for the process control system. Any number of I/O devices may be provided on or added to the segments. I/O devices may be added to replace faulty I/O devices, or to allow more devices to be controlled by the process control system.

While controllers of a process control systems utilize a particular I/O communication protocol to communicate with I/O devices which support that same I/O communication protocol, the controllers are unable to communicate with I/O devices utilizing any other I/O communication protocol. Further, the controllers utilizing a particular version of the I/O communication protocol may communicate with I/O devices utilizing the same or possibly a more primitive version of the I/O communications protocol. However, the controllers may be unable to support I/O devices using a newer version of an I/O communication protocol than is used by the controller within the process control system.

Because of the many I/O communication protocols and versions of I/O communication protocols in existence for process control systems, manufacturers must solicit a large amount of information from a customer in need of new I/O devices in order to insure the correct I/O device is provided. Such information includes the specific I/O device needed (for example, a HART I/O device, and Fieldbus I/O device such as a link master device, a basic device, a bridge device, etc.), the particular I/O communications protocol used between the controller and the I/O devices of the customer's process control system, and the version of the I/O communications protocol used in the controller. Soliciting such a large amount of information increases the possibilities for errors in the solicited information, and can result in the incorrect I/O device being sent to the customer. Additionally, I/O device manufacturers must maintain an inventory of many types of each specific I/O device to account for each I/O communication protocol and versions thereof, requiring a large storage space and complex inventory management. Further, such a varied assortment of I/O devices from the manufacturer leads to increased chances of retrieving the incorrect I/O device to be sent to a customer, even where the correct information is provided by the customer and recorded by the manufacturer employee. In addition, when the customer does receive the I/O device, the device must be configured by a system user to operate with the process control system. For example, the system user must enter into the process control system the version of the I/O communication protocol used by the I/O device. Failure to enter or incorrect entry of the version of the I/O communication protocol utilized by the I/O device may cause any I/O devices and any field devices (sensors, valves, etc.) connected to the I/O device to function improperly, as the process control system may attribute functionality to the I/O device which is not present within the I/O device, which can result in process control system errors when the device is requested to carry out such functionality. The I/O devices typically must be reconfigured upon upgrading of a controller for the process control system. Further, because of the multiple versions of a particular communication protocol, the customer must also maintain an inventory of many types of the specific I/O devices as backup devices, so that when an I/O device becomes faulty, it may be replaced by another I/O device of the same version of the particular I/O communication protocol under which the controller of the process control system operates.

Although the I/O devices facilitate the communications between the controllers and the devices on the segments, process control ceases, at least with respect to the devices on a particular segment, if the I/O device for the segment goes out of service for whatever reason. The impact of a disabled I/O device and disruption to process control may be reduced by providing a backup I/O device that is connected to the segment and that takes over for the disabled I/O device. Typically, I/O devices possess diagnostic software for detecting faults in the I/O device. Where a controller does not receive information from a particular I/O device for a predetermined number of attempts to communicate with the I/O device, for example three attempts, the controller orders the particular I/O device to perform self-diagnostics. Where the self-diagnostics detect a fault condition in the particular I/O device, the fault condition is communicated from the particular I/O device to the controller, which removes the particular I/O device from service and activates the corresponding backup I/O device on the segment. However, because multiple failed communication attempts are typically required before the controller orders diagnostics to be performed by the I/O device, it may take several seconds for a faulty I/O device to be detected by the controller, during which time devices controlled by the faulty I/O card continue to operate under limited or no control/monitoring, posing a potentially dangerous situation to process control workers.

Further, in some circumstances, the faulty I/O device prevents all other I/O devices on the bus connecting a controller to various I/O devices from communicating with one another and the controller. For example, the faulty I/O device may produce an undesirable signal on a bus data line(s) common to all I/O devices on the bus. The undesirable signal prohibits communication between all I/O devices and the controller on the bus, causing the bus to go out of service. Such a condition may pose a danger to workers working near the process control system as the process activities controlled by the bus may be operating with limited or no control and/or monitoring.

Therefore a need exists for an I/O device which is less burden for a device manufacturer to provide and for a customer to install. Further, there is a need for quickly communicating I/O device faults to a controller. Additionally, a need exists for an I/O device which, when faulty, does not prevent other devices and the controller from communicating over the bus connecting the I/O devices to the controller.

SUMMARY

An I/O device is provided for use in a process control system operating under a particular version of I/O communication software and includes an I/O device processor for controlling operation of the I/O device. An interface is communicatively linked to the processor for interfacing the I/O device with the process control system, and a storage device is communicatively linked to the processor for storing a plurality of potential versions of I/O communication software, each of the plurality of versions of I/O communication software usable by the processor in controlling the I/O device. The device processor uses the interface to determine the particular version of I/O communication software utilized by the process control system, for example a controller, and determines which version of I/O communication software of the plurality of versions stored in the I/O device that is compatible with the particular version of I/O communication software used by the controller. Thereafter, the device processor configures the I/O device to operate using the compatible version of I/O communication software.

In one embodiment, the device processor determines the particular version of I/O communication software used by the controller using previously-unused portions of messages transmitted between the I/O device and the controller. Alternatively, the device processor may use specialized messages between the I/O device and the controller to determine the particular version of I/O communication software used by the controller.

Further, an I/O device is provided for use in a process control system for communications in a process control network, where the process control system including a plurality of I/O devices in communication via a bus. The I/O device has an interface for communicatively linking the I/O device with the bus, and a device processor coupled with the interface for controlling operation of the device including performing fault detection for the device. The device processor, upon detection of a potential device fault, severs the communication link provided by the interface with the bus.

The I/O device may use relays controlled by the device processor to sever communication with the bus. For example, where the bus includes a data line and the interface communicatively links the I/O device to the data line, the device processor may actuate the relay to sever the communication link with the data line upon detection of an I/O device fault. Similarly, where the bus includes a plurality of data lines, and the interface communicatively links the I/O device with the plurality of data lines, the I/O device may include a plurality of relays, one for each of the data lines. The device processor may actuate one or more of the plurality of relays to sever the communication link with the data lines of the bus upon detection of a device fault. Additionally, a process control system for communications in a process control network having a plurality of devices, includes a bus and a primary and secondary redundant device pair in communication with the bus. The secondary redundant device is programmed for detecting faults with the primary redundant device. Upon detection of the primary redundant device fault, the secondary redundant device notifies a controller of a potential primary redundant device fault. Responsive to the primary redundant device fault message, the controller may immediately order the primary redundant device to perform a self-diagnostic. Alternatively, the controller may deactivate the primary redundant device and activate the secondary redundant device.

A fault may be detected using a dedicated communication link between the primary and secondary redundant devices. For example, the secondary redundant device may detect a primary redundant device fault where the primary redundant device fails to communicate with the secondary redundant device at a predetermined time. Upon detection of the primary redundant device fault, the controller for the process control system is notified, which may then immediately order the primary redundant device to perform self-diagnostics. Where the primary redundant device diagnostics indicate a fault with the primary redundant device, the controller may deactivate the primary redundant device and activate the secondary redundant device and notify the system operator. Where the primary redundant device diagnostics indicate no fault with the primary redundant device, the controller may leave the primary redundant device active, and notify the system operator.

The features and advantages of the invention will be apparent to those of ordinary skill in the art in view of the detailed description of the preferred embodiment, which is made with reference to the drawings, a brief description of which is provided below.

DESCRIPTION

While the devices of the present invention are described in detail in conjunction with a process control network that implements process control functions in a decentralized or distributed manner using a set of Fieldbus, HART and 4-20 milliamp (mA) devices, it should be noted that the devices of the present invention can be used with process control networks that perform distributed control functions using other types of field devices and I/O device communication protocols, including protocols that rely on other than two-wire buses and protocols that support only analog or both analog and digital communications. Thus, for example, the devices of the present invention can be used in any process control network that performs distributed control functions even if this process control network uses the HART, PROFIBUS, etc. communication protocols for communication between the I/O devices and field devices connected thereto, and uses any standard I/O communication protocol, or any proprietary I/O communication protocol (e.g. which may be implemented within the DeltaV process control system) to effect communications between the controller and I/O devices of the process control system. Any other I/O communication protocols that now exist or that may be developed in the future may also be used. Furthermore, the I/O devices of the present invention may be used with any desired process control field device, including valves, positioners, transmitters, etc.

Figure 1:
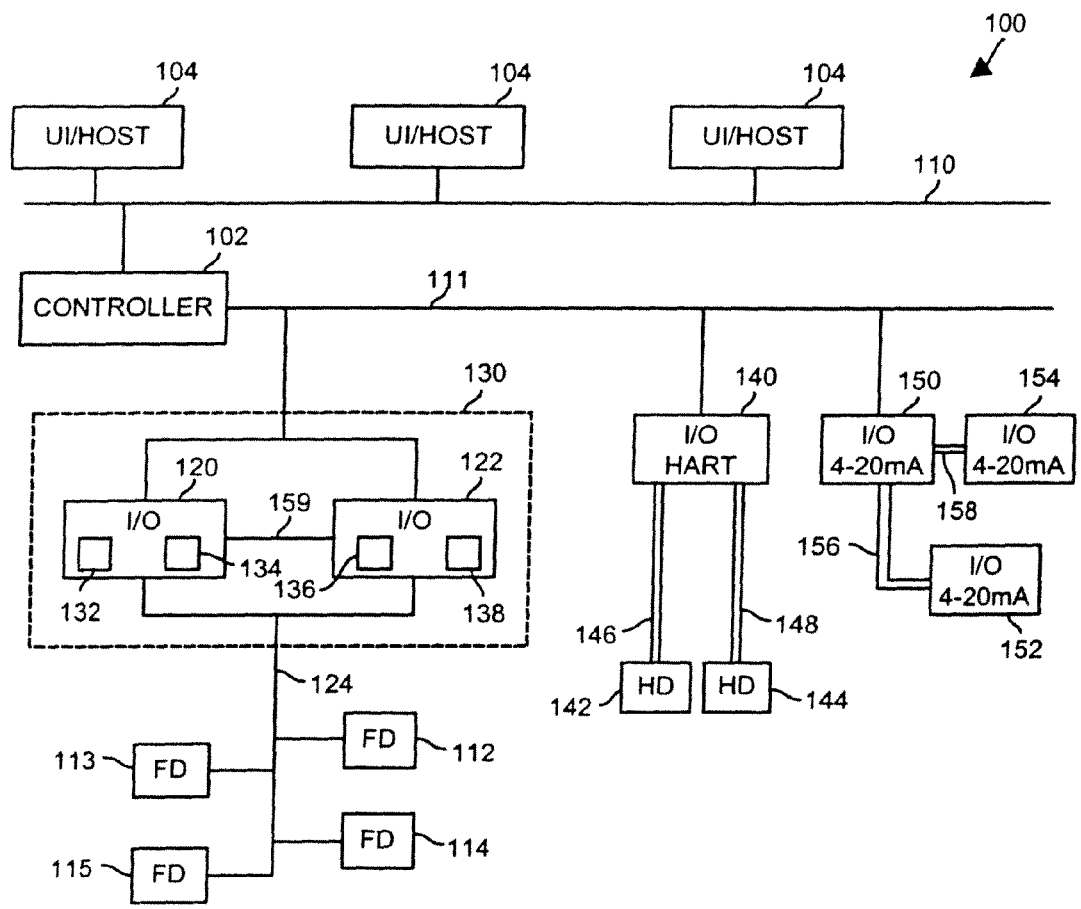
FIG. 1 is a schematic functional block diagram of a process control system.

FIG. 1 illustrates a process control network 100, which may be, for example, a DeltaV process control system sold by Fisher-Rosemount Systems, Inc. of Austin, Tex. The process control network 100 includes one or more controllers 102, one or more host or operator workstations 104, and/or other computer devices such as other workstations, databases, configuration stations, etc. connected to a bus 110 which may be, for example, an Ethernet bus. As is known, the controller(s) 102 and workstations 104 include processors that implement software stored in memories of those devices. The controller 102 may be, for example, a distributed control system controller or any other type of controller implemented in, for example, a personal computer, dedicated processor or server, or other device that allows a user or an operator to interface with the process control system 100 in any known manner.

The controller 102 is connected to various I/O devices via a backplane 111, including redundant Fieldbus I/O devices 120 and 122 operating together as a single I/O device 130, HART I/O device 140, and a 4-20 mA I/O device 150.

Numerous field devices 112-115 are illustrated as being connected to the controller 102 via the redundant I/O Fieldbus devices 120 and 122 that will be described more fully herein. The field devices 112-115 are illustrated as being connected to a bus segment 124 which may be any desired type of bus, such as a Fieldbus link. In this case, the devices 112-115 may use the Foundation Fieldbus communication protocol. Of course, each of the field devices 112-115 may be any type of field device used in the process control network 100 including, for example, sensors, control valves, positioners, fans, video cameras, microphones, etc.

The HART I/O device 140 connects HART devices 142 and 144 to the controller 102 using HART communication lines 146 and 148 respectively, which provide both a Digital and Analog communication link between the HART I/O device 140 and HART devices 142 and 144, as is understood by one skilled in the art. The 4-20 mA I/O device 150 is connected to 4-20 mA devices 152 and 154 via 4-20 mA communication lines 156 and 158 respectively. The 4-20 mA communication lines 156 and 158 provide an analog communication link between the 4-20 mA I/O device 150 and the 4-20 mA field devices 152 and 154, as is understood by one skilled in the art. The HART field devices 142 and 144, and the 4-20 mA field devices 152 and 154 may be, for example, sensors, control valves, and fans, as well as any other type of device compatible with the respective HART and 4-20 mA communication protocols. Other I/O devices utilizing other communication protocols now in existence or that become available in the future may be connected to the backplane 111, as is understood by one skilled in the art.

The controller 102 communicates with the I/O devices 120, 122, 140 and 150 over the backplane 111 using in one embodiment a proprietary I/O communication software, such as is provided as a part of the DeltaV communication software. The I/O communication software is typically available in multiple versions, where each version provides varying levels of functionality to the process control system.

As illustrated in FIG. 1, the redundant I/O devices 120 and 122 are connected in parallel on the segment 124 between the controller 102 and the field devices 112-115. For purposes of the following discussion, the I/O device 120 will also be referred to as the primary I/O device 120, and the I/O device 122 will also be referred to as the secondary I/O device 122. In this example, each I/O device 120 and 122 has a unique address based on the node to which the device is connected. The controller 102 and field devices 112-115 identify messages from the I/O devices 120 and 122 based on the presence of the address in the messages transmitted on the bus segment 124. In order to implement redundancy, the I/O devices 120 and 122 are configured to operate as a single virtual I/O device 130 communicating with controller 102 and field devices 112-115 in the same manner regardless of which of the I/O devices 120 and 122 is active and communicating on the bus segment 124. One of the I/O devices 120 and 122, whichever device is currently the active I/O device of the virtual I/O device 130, communicates transparently with the controller 102, the field devices 112-115 and the other devices of the network 100 by publishing messages having the same address (a virtual publishing address). By publishing messages using the virtual publishing address, all virtual I/O device 130 messages appear the same and are processed the same way by the controller 102 and field devices 112-115 regardless of which I/O device 120 and 122 actually published the message.

The virtual publishing address for the virtual I/O device 130 may be the unique physical address for one of the I/O devices 120 or 122 or any other unique address that is assigned to the virtual I/O device 130. Regardless of the value of the virtual publishing address or the manner in which the virtual publishing address is assigned, the virtual publishing address and the code for implementing the virtual I/O device 130 is stored in the communication stack of the I/O devices 120 and 122. Additionally, the Fieldbus publisher VCRs in the controller 102 and the field devices 112-115 are configured with the virtual publishing address for the virtual I/O device 130 instead of the address of either I/O device 120 or 122.

During normal operation of the process control network 100, one of the I/O devices 120 and 122 is actively sending and receiving messages on the Fieldbus segment 124, operating as the LAS for the bus segment 124, performing process control functions, and the like, that are to be performed by the virtual I/O device 130 to effect process control in the process control network 100. For the purposes of the following discussion, the I/O device 120, which has previously been identified as the primary I/O device 120, is initially the active I/O device for the virtual I/O device 130. The I/O device that is not acting as the active I/O device for the virtual I/O device 130, in this case the secondary I/O device 122, is considered to be the backup I/O device for the virtual I/O device 130. While in the backup mode, the backup I/O device 122 does not perform any of the process control or communication functions of the virtual I/O device 130. However, the backup I/O device 122 is configured with the VCRs for the virtual I/O device 130 and listens to the bus segment 124 for messages transmitted on the bus segment 124 that are intended for the virtual I/O device 130. The backup I/O device 122 receives and decodes the messages, and stores any information from the messages that would normally be stored by the active I/O device 120. The backup I/O device 122 may even process information and update data stored therein, receive and store updated link active schedules, and execute any other functions that are necessary for the backup I/O device 122 to take over the process control functions of the virtual I/O device 130 if the active I/O device 120 becomes disabled or is otherwise taken out of service.

In addition to receiving and processing messages transmitted by the field devices 112-115 to the virtual I/O device 130, the backup I/O device 122 also receives and stores the messages published by the active I/O device 120 to the other devices on the bus 110. This functionality is implemented by programming the communication stacks of the I/O devices 120 and 122 for the backup I/O device 122 to listen for messages published by the active I/O device 120. Each device communicating on the bus 110 has both a publishing buffer for compiling and storing the messages that are to be communicated by the device on the bus 110, and a subscribing buffer for storing messages that are received from other devices in the process control network 100. For example, the primary I/O device 120 has a publishing buffer 132 and a subscribing buffer 134, and the secondary I/O device 122 has a publishing buffer 136 and subscribing buffer 138. The publishing buffer of the backup I/O device 122 preferably receives and stores the most recently published message from the publishing buffer of the active I/O device 120.

The backup I/O device 122 is able to receive and store messages published by the active I/O device 120 by configuring the communication stack of the redundant I/O devices to have the publishing buffer of the backup I/O device 122 function as a subscribing buffer for messages published from the publishing buffer of the active I/O device 120. While in the backup mode, the publishing buffer of the backup I/O device 122 ceases performing the normal functions of a publishing buffer, such as responding to compel data requests and connection establishment messages. At the same time, the backup I/O device listens to the Fieldbus segment 124 for published messages having the virtual publishing address for the virtual I/O device 130. When a message published by the active I/O device 120 is detected, the backup I/O device 122 decodes the message and stores the message in its publishing buffer instead of its subscribing buffer. Additionally, to implement communication directly between the I/O devices 120 and 122, a separate line 159 may connect the I/O devices 120 and 122.

Figure 2:
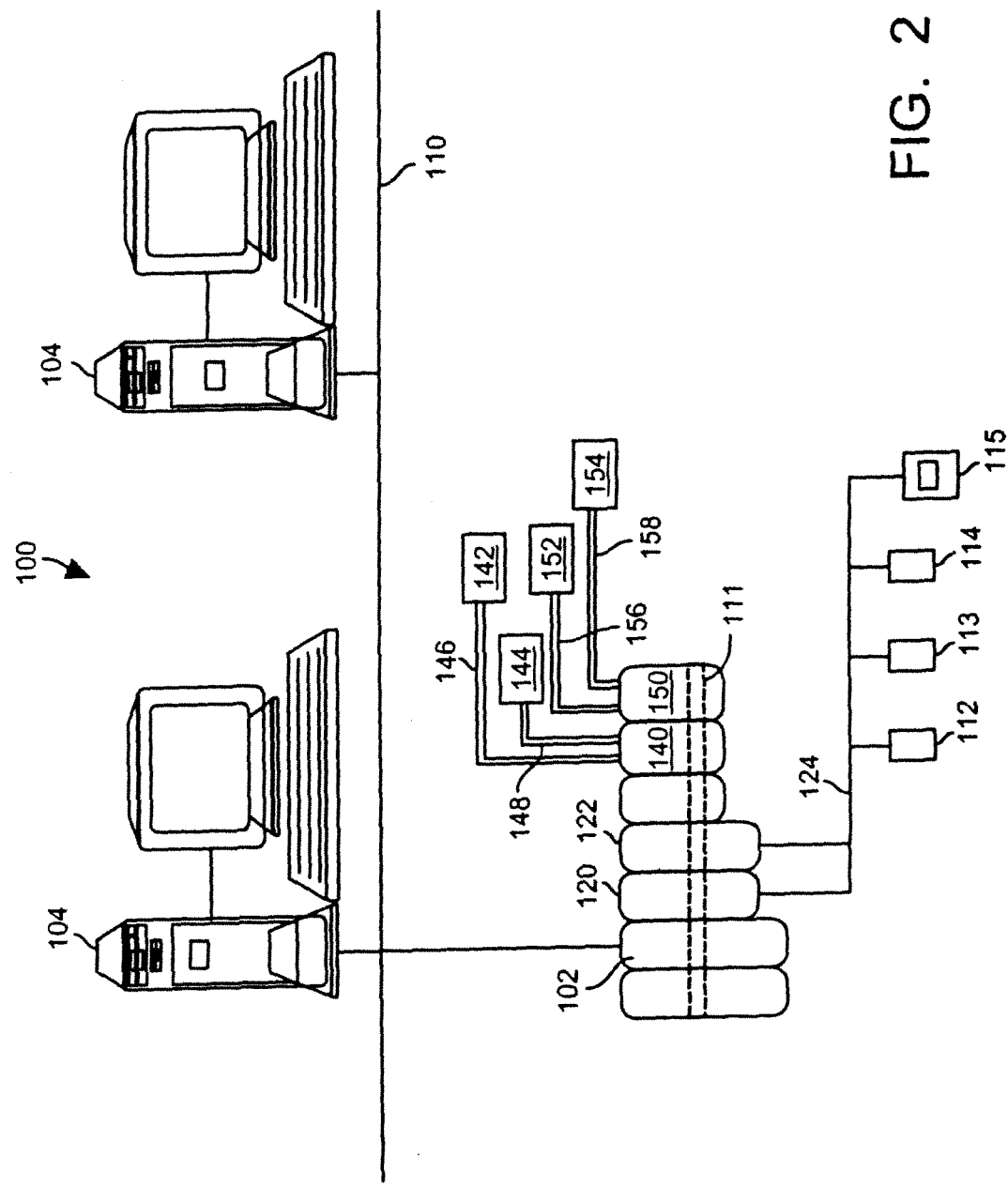
FIG. 2 is a schematic block diagram of the process control network of FIG. 1.

Referring now to FIG. 2, the physical configuration of the process control network 100 of FIG. 1 is illustrated. The controller 102, I/O devices 120, 122, 140 and 150, and other devices are connected to the Fieldbus segment 124 via the backplane 111 having a plurality of ports or slots with pin connections. The I/O devices 120, 122, 140 and 150 are connected to the slots of the backplane 111 and the backplane is configured so that the I/O devices are properly connected to the bus segment 124 if need be. For example, to implement the process control network 100, the backplane 111 is configured so that the slot to which the controller 102 is connected is in series between the bus 110 and the I/O devices 120, 122, 140 and 150, and the slots to which the I/O devices 120, 122, 140 and 150 are connected are parallel to each other and with the controller 102. Further, the I/O devices 120 and 122 are connected in series between the controller 102 and the field devices 112-115 on the Fieldbus segment 124. While the physical connection of the I/O devices to backplane is primarily used for exchanging information between the I/O devices and implementing process control, the physical connection may also be used to inform the I/O devices 120, 122, 140 and 150 as well as the other devices on the process control network 100 that specific I/O devices, for example the I/O devices 120 and 122, form a redundant pair of I/O devices.

Moreover, the connection between the controller 102 and the I/O devices 120 and 122 may be used to control the switchover of the backup I/O device 122 to the active mode. For example, the I/O devices 120 and 122 may be configured to transmit status information to the controller 102. The status information may include alarm messages with information that the active I/O device 120 has or is about to become disabled. The controller 102 may be programmed to respond to an alarm message by switching the operating modes of the I/O devices 120 and 122 such that the active I/O device 120 assumes the backup mode, and the backup I/O device 122 assumes the active mode. The controller 102 may further be programmed to transmit a message to a host 104 indicating that the I/O device 120 requires maintenance.

As is apparent to one skilled in the art, process control schemes or routines may be implemented on the process control network 100 having a number of different loops or segments therein. Generally speaking, each control loop controls one or more field devices to control some part of a process. In order to effect process control, and to exchange other information related to the operation and status of the controlled process, the controllers and the field devices on a segment of the bus transmit messages back and forth on the segment. The communications between the controllers and the field devices are facilitated by I/O devices connected to the bus between the controller and the field devices. For example, the master information base (MIB) of a Fieldbus I/O device is programmed with VCRs indicating that the I/O device is to receive the messages from the field devices and pass the messages along the segment to the controller or vice versa. Additionally, the I/O device may act as the link access scheduler (LAS) for the segment and transmit messages on the bus that schedule and control communications on the segment. Moreover, the Fieldbus I/O device may include function blocks that perform process control functions. In the latter capacities, the I/O device itself may transmit messages on the Fieldbus addressed to subscribing field devices that detect the messages and decode and process the information contained therein.

Figure 3:
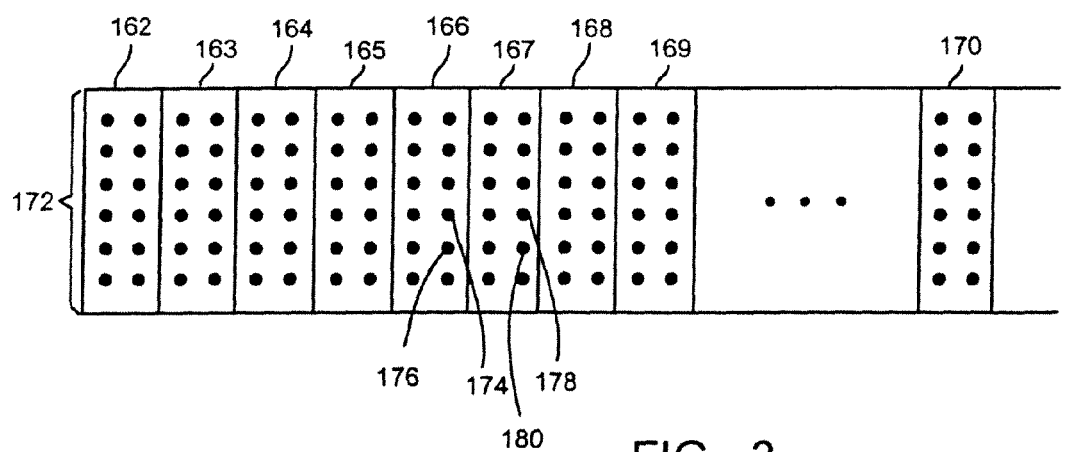
FIG. 3 is a schematic diagram of the backplane for implementing communications between the controller and the I/O devices of FIG. 1.

FIG. 3 illustrates a schematic representation of the backplane 111 of FIGS. 1 and 2. The backplane 111 includes a plurality of slots 162-170, each capable of connecting an I/O device to the controller 102. Each slot 162-170 has a plurality of pins 172 that are inserted into associated ports on the devices connected thereto to establish an electrical connection between the backplane and the I/O devices. Additionally, the backplane 111 is configured with the appropriate electrical connections between the slots 162-170 to properly interconnect the I/O devices connected to the slots 162-170 with the controller 102.

One configuration for establishing the redundant I/O devices as a redundant pair is to designate specific slots on the backplane 111 for the primary and secondary I/O devices that comprise the redundant pair. For example, it may be predetermined that, for the process control network 100, the fifth slot 166 and sixth slot 167 on the backplanes 111 for bus segments are reserved for the redundant I/O devices 120 and 122. Specifically, the primary I/O device is connected to the fifth slot 166 and the secondary I/O device is connected to the sixth slot 167. In this implementation of redundant I/O devices, the I/O devices 120 and 122 are programmed to recognize the connection to the fifth or sixth slots 166 or 167 and the designation as either the primary or the secondary I/O device depending on the slot 166 or 167 to which they are connected, and the associated default operating mode, either active or backup. When the I/O devices 120 and 122 are connected to the backplane, I/O device 120, as the primary I/O device, is connected to the fifth slot 166, and I/O device 122, the secondary device, is connected to the sixth slot 167. The I/O device 120 detects the connection to the fifth slot 166 and determines that it is the primary I/O device of a redundant pair of I/O devices and assumes the role of the active I/O device for the virtual I/O device 130. Similarly, the I/O device 122 detects the connection to the sixth slot 167 and determines that it is the secondary I/O device of a redundant pair of I/O devices and assumes the role of the backup I/O device for the virtual I/O device 130. Moreover, the controller 102 may be programmed to sense the presence of redundant pairs of I/O devices on the backplane 111. Upon sensing I/O devices 120 and 122 connected to the fifth and sixth slots 166 and 167, respectively, the controller 102 may also automatically update the displays of the host/operator workstation 104 with the redundant I/O devices 120 and 122. Of course, the I/O devices may detect their connection to a specific slot and the redundant operation associated with that slot by the configuration of pins or other hardware (or software) on the backplane.

An alternative configuration for implementing the redundant I/O devices is to manipulate the voltage levels of the pins 172 to which the I/O devices are connected. Each of the slots 162-170 is illustrated with twelve pins 172 to connect the I/O devices to the slots 162-170 of the backplane 111, although the use of more or fewer pins 172 is anticipated based on requirements of the hardware being connected to the bus 110. Two pins 172 in each slot are necessary to establish the relationship between the I/O devices 120 and 122: the first pin indicating that the slot is one of a pair of redundant I/O devices, and the second pin indicating whether the I/O device connected thereto is the primary or the secondary I/O device. Just as the I/O devices in the preceding example were programmed to detect the slot to which they were connected, the I/O devices in this alternative embodiment are programmed to evaluate the voltage level of the designated pins to determine whether they are part of a redundant pair of I/O devices. In this example, the tenth pins 174 and 178 of the fifth and sixth slots 166 and 167, respectively, are set to high to indicate that the I/O devices connected thereto are part of a redundant pair of I/O devices. The eleventh pins 176 and 180 of the slots 166 and 167, respectively, are set to high to indicate that the slot 166 or 167 is the right slot of the redundant pair, and low to indicate that the slot 166 or 167 is the left slot of the redundant pair. The value of the eleventh pins 176 and 180 also determines which I/O device is the primary device and which is the secondary device. In the present example, a low value on the eleventh pin 176 or 180 indicates the primary I/O device. Consequently, in this example, both tenth pins 174 and 178 are set high, the eleventh pin 176 of fifth slot 164 is set low indicating that the slot 166 is the left slot of the pair and that the I/O device connected thereto is the primary I/O device, and the eleventh pin 180 of sixth slot 167 is set high indicating that the slot 167 is the right slot of the pair and that the I/O device connected thereto is the secondary I/O device. As in the preceding example, the I/O devices 120 and 122 are programmed to evaluate the tenth and eleventh pins of the slot to which they are connected to determine whether they are part of a redundant pair of I/O devices and whether they are the primary or secondary I/O devices.

Moreover, the host or operator workstations 104 may detect via the controller 102 whether a redundant pair of I/O devices is connected to the bus segment 124 and display information related to the redundant pair of I/O devices to the users if such a pair is detected. The host or operator workstations 104 may include a user interface having a display for information regarding the process control network and its devices. In order to acquire the necessary process and device data, the host 104 may be configured with auto-sensing functionality whereby it causes the controller 102 to periodically poll the nodes on the backplane to determine whether I/O devices are connected and, if I/O devices are present, acquire information about the I/O devices for displaying to the system users. The host 104 and/or field devices can be configured so that the auto-sensing functionality detects the presence of the redundant I/O devices 120 and 122. For example, the I/O devices 120 and 122 may be programmed to transmit, and the host 104 may be programmed to receive, messages indicating that the I/O devices 120 are redundant along with their current operating mode. Alternatively, the host 104 may be programmed in a similar manner to the I/O devices 120 and 122 with information that designated slots are reserved for redundant I/O devices 120 and 122, and detect when a device is connected to the designated slots. Other alternative configurations for having the host 104 detect the presence of the redundant I/O devices and displaying the information at the user interface are contemplated by the inventor and will be apparent to those skilled in the art.

As discussed above, the controller 102 communicates with the I/O devices using an I/O communication protocol, typically a proprietary I/O communication protocol, for example included within the DeltaV software of Fisher process control systems. The I/O communication protocol encompasses any communication protocol and format of data fields within the communication protocol used to communicate information between a controller and I/O devices linked with the controller. For example, the I/O communication protocol may include a standard communication protocol such as the Railbus protocol for transmitting information between the controller and the I/O devices, with the information placed in data fields of the Railbus protocol in a format specific to the controller and I/O device manufacturer.

Within a particular I/O communication protocol, different versions of the protocol may exist providing varying levels of functionality for the process control system within the particular protocol. The different versions of the I/O communication protocol need not change the physical format of the I/O communication protocol, but rather may provide new functionality using, for example, new commands transmitted within the same physical format of the I/O communication protocol. New versions of the process control software such as the DeltaV software incorporating new functionality will use a new I/O communication protocol as new commands or data fields are used to communicate the new aspects of the additional functionality. Controllers of process control systems utilizing a particular version of an I/O communications protocol may be unable to support I/O devices using a newer version of a protocol than is used by the controller of the process control system.

Because of the many I/O communications protocols and versions of these protocols in existence for process control systems, manufacturers must solicit a large amount of information from a customer in need of a new I/O device in order to assure that the correct I/O device is provided. Soliciting such a large amount of information increases the possibilities for errors in the solicited information (for example, incorrect information provided by the customer or recorded by the manufacturer employee), resulting in the incorrect I/O device being sent to the customer. Additionally, I/O device manufacturers must maintain an inventory of many types of each specified I/O device to account for each I/O communication protocol and versions thereof, requiring a large storage space and a complex inventory management. Further, such a varied assortment of I/O devices by the manufacturer leads to increased chances of retrieving the incorrect I/O device to be sent to a customer, even where the correct information is provided by the customer and recorded by the manufacturer employee. In addition, when the customer receives the I/O device, the device must be configured by a system user to operate with the process control system. For example, the system user must enter into the process control system the version of the I/O communication protocol used by the I/O device. Failure to enter or incorrect entry of the version of the I/O communication protocol utilized by the I/O device may cause any I/O devices and any field devices (sensors, valves, etc.) connected to the I/O device to function improperly, as the process control system will attribute functionality to the I/O device that is not present within the I/O device, resulting in process control system errors when the device is requested to carry out such functionality. Further, the I/O devices must typically be reconfigured upon upgrading of the controller for the process control system. Additionally, because of the multiple versions of a particular I/O communication protocol available, the customer must maintain multiple types of a specific I/O device as backup I/O devices to replace faulty I/O devices. Thus, there is a need for an I/O device that is easier for a device manufacturer to maintain and provide to a customer, and for a customer to install.

To help with these problems, an I/O device is provided for use in a process control system operating under a particular version of I/O communication software and includes an I/O device processor for controlling operation of the I/O device. An interface is communicatively linked to the processor for interfacing the I/O device with the controller, and a storage device is communicatively linked to the processor for storing a plurality of potential versions of I/O communication software, each of the plurality of versions of I/O communication software usable by the processor in controlling the I/O device. The device processor uses the interface to determine the particular version of I/O communication software utilized by the controller, determines a version of I/O communication software of the plurality of versions of I/O communication software stored in the storage device that is compatible with the particular version of I/O communication software used by the process control system, and configures the I/O device to operate using the compatible version of I/O communication software.

Providing the I/O device with a storage device that stores a plurality of versions of I/O communication software, where the I/O device processor uses the interface to determine the particular version of I/O communication software used by the controller, and configures the device to operate using a compatible version of I/O communication software stored within the storage device (memory) greatly reduces the amount of information that a device manufacturer must solicit from a customer in order to ensure that the correct I/O device is provided. Because the storage device stores a plurality of versions of I/O communication software, only the I/O communication software type used between the I/O device and controller and specific I/O device need be solicited from the customer. Further, because the I/O device includes a plurality of potential versions of I/O communication software, the I/O device manufacturers need only maintain a single type of each specific I/O device to account for various versions of the I/O communication software, because the various versions of the I/O communication software are located within the storage device of the I/O device. This reduces the necessary storage space and inventory management complexity needed by the device manufacturer and the customer. In addition, the reduced number of types of each specific I/O device further reduces the chances of retrieving the incorrect I/O device to be sent to a customer. Additionally, because the I/O device processor uses the interface to determine the particular version of I/O communication software utilized by the process control system and configures the device to operate using a compatible version of I/O communication software from the storage device within the I/O device, the particular version of I/O communication software to be utilized by the I/O device need not be determined or entered by a system user. Thus, the overhead costs and potential for error due to incorrect version information entry associated with the I/O device configuration are reduced, saving the customer money and improving safety for process system workers.

Figure 4:
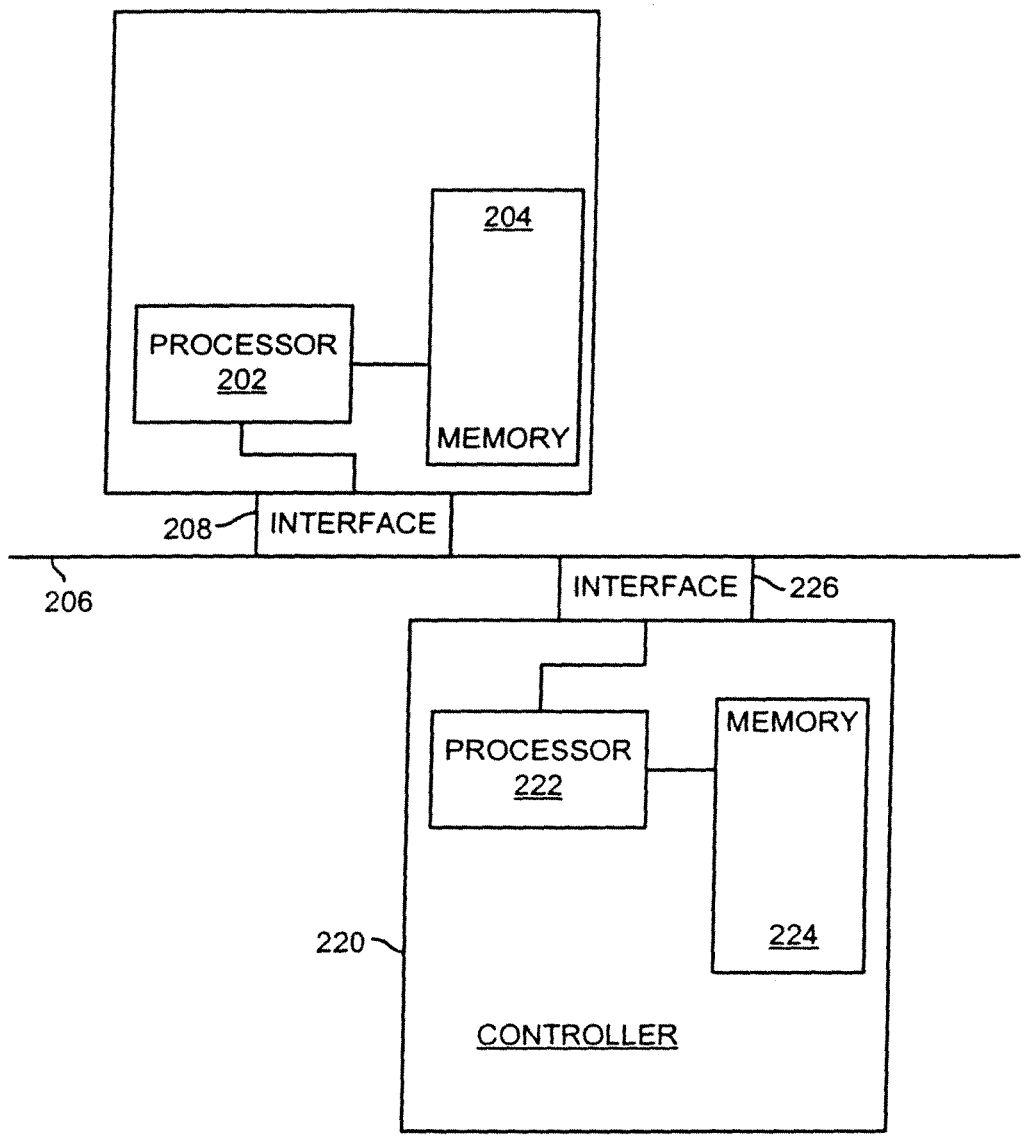
FIG. 4 is a schematic block diagram of an I/O device and controller used in a process control system.

FIG. 4 illustrates an I/O device 200 for implementing automatic configuring functionality. The I/O device 200 includes a processor 202 for controlling operation of the I/O device 200, and a memory 204 coupled to the processor 202, where the memory 204 stores various items including programming for the I/O device 200. The processor 202 is further coupled to a bus 206 via an interface 208. The bus 206 may be, for example, the backplane 111 of FIG. 1. A controller 220 is further connected to the bus 206, and includes a processor 222 which controls operation of the controller 220 using programming stored within a memory 224. The processor 222 is further coupled to the bus 206 via an interface 226.

Figure 5:
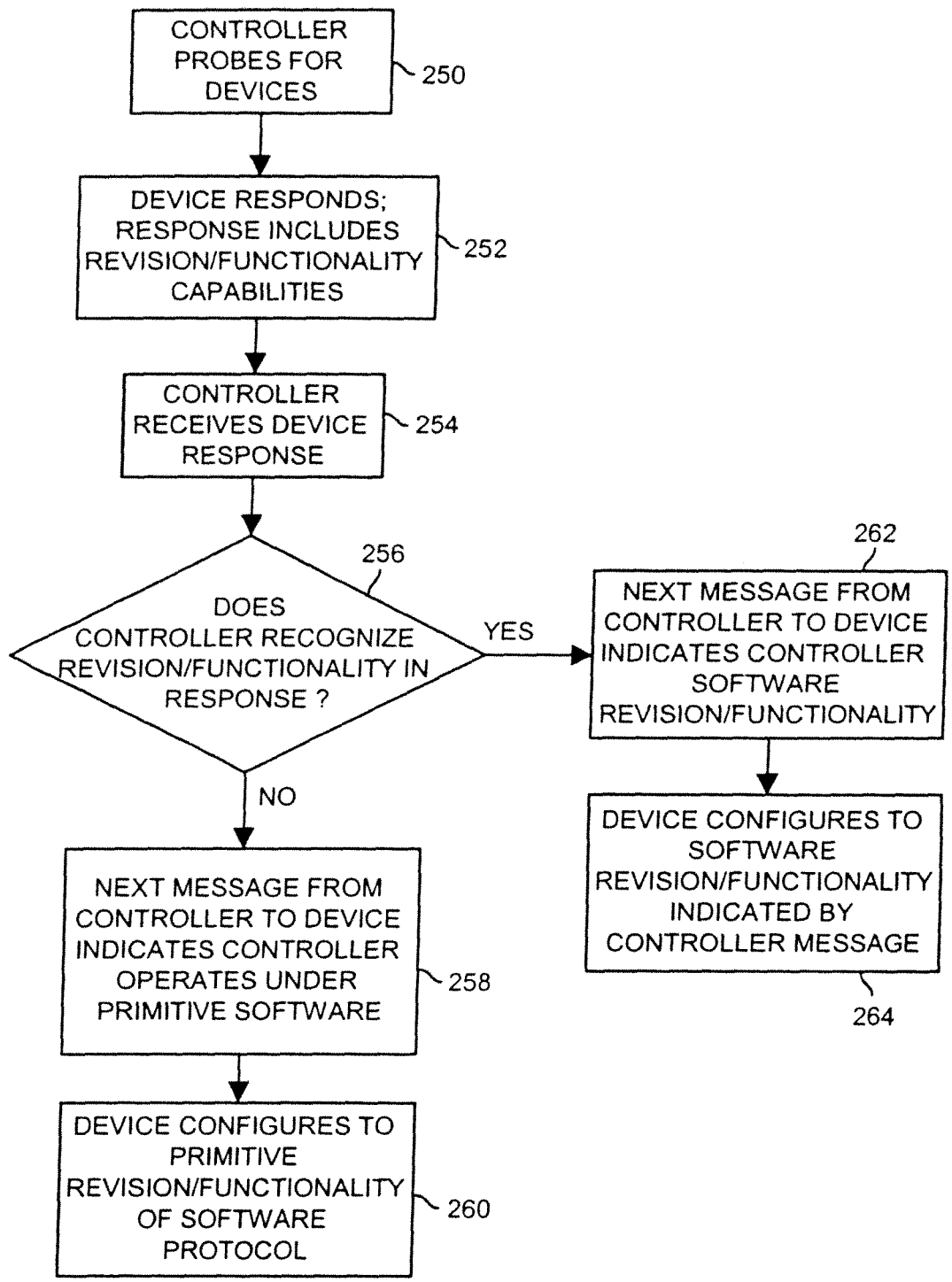
FIG. 5 is a flowchart illustrating operation of the I/O device of FIG. 4.

The I/O device 200, controller 220 and bus 206 form in whole or in part a process control system to affect control of various processes such as chemical, petroleum, and other manufacturing and refining processes. The operations performed by the I/O device 200 and the controller 220 may be implemented and carried out using any suitable I/O communication software (protocol) including but not limited to a proprietary I/O communication protocol, such as DeltaV protocol, or a standard I/O communication protocol. Further, the communication between the I/O device 200 and any field devices (not shown) connected with the I/O device 200 may be accomplished using a proprietary communication protocol, or standard communication protocols including but not limited to the HART, Profibus, and Foundation Fieldbus protocols. The I/O device 200 may be any of the I/O devices 120, 122, 140 and 150 of FIG. 1, the controller 220 may be the controller 102 of FIG. 1, and the bus may be the backplane 111 of FIG. 1. In accordance with this embodiment, the memory 204 includes a plurality of versions of the particular I/O communication protocol under which the I/O device 200 and the controller 220 communicate. The plurality of versions offer various functionality within the particular I/O communication protocol, and are usable by the processor 202 in controlling operation of the I/O device 200. Operation of the I/O device 200 is discussed with respect to FIG. 5.

As shown in Box 250, the processor 222 of the controller 220 probes for I/O devices connected to the bus 206. Typically, such probing is accomplished using a probe message which is sent to a particular node or address on the bus 206 to which I/O devices such as the I/O device 200 may be connected. The purpose of the probe message is to compile a list of devices connected within the process control system, or on a particular bus segment of the process control system. Such probing is typically initiated when a controller is connected to the bus 206, to determine which nodes of the bus are "LIVE" (are connected to a functioning I/O device), and which address nodes are "DEAD" (are not connected with a functioning I/O device). Further, the probe message may be initiated to detect newly added I/O devices to the bus 206. Such probe node messages may also be sent out periodically to address nodes of the bus not previously recorded as including an I/O device to determine whether or not an I/O device has been connected to that particular address node. Such probe message may be sent once a second, or at any other predetermined interval sufficient for timely detecting new devices added to the bus 206. Upon receiving the probe message from the processor 222, the I/O device 200 generates a probe response message as shown in step 252. The probe response message may include version/functionality capabilities of the I/O device 200, for example the I/O communication protocol software versions present within the memory 204. This information may be placed within a standard probe response message using portions of the probe response message previously unused. For example, in the primitive (i.e. most basic) version of the I/O communication protocol provided with the DeltaV software, a power up sequence message from the I/O device 200 forms the probe response message, and includes previously-unused portions (bit locations within the message) which may be used for placement of the version/functionality capabilities of the I/O device 200.

Upon receiving the probe response message, at box 254, the processor 222 determines the contents of the probe response message from the I/O device 200. Where the processor 222 of the controller 220 is operating under a primitive version of the I/O communication protocol, the processor 222 will not have capabilities for viewing the portions of the probe response message indicating the version of I/O communication protocol available in the I/O device 200, and thus will not recognize the version/functionality indicated by the probe response message, box 256. Accordingly, the next message sent from the controller 220 to the I/O device 200 will indicate that the processor 222 and controller 220 operate under the primitive version of the I/O communication protocol. This indication is provided to the I/O device 200 by, for example, failure of the controller 220 in utilizing the previously-unused portions of messages transmitted between the controller 220 and the I/O device 200, box 258. Accordingly, the processor 202 of the I/O device 200 determines that the previously-unused portions are unused by the controller 220, and configures the I/O device 200 to operate under the primitive version/functionality of the I/O communication protocol as shown in box 260. This is accomplished by the processor 202 accessing the portion of the memory 204 containing the version/functionality of the I/O communication protocol software utilized by the controller 220, and controlling operation of the I/O device 200 using this particular software version from the memory 204.

Where the processor 222 does recognize the version/functionality in the probe response message (specifically the information placed into the previously-unused portion of the probe response message from the I/O device 200), box 256, the next message from the controller 220 to the I/O device 200 indicates the controller 220 version/functionality, step 262. The controller 220 version/functionality may be indicated by the processor 222 utilizing the previously-unused portions of the next message from the controller 220 to the I/O device 200, where the previously-unused portion of the next message indicates the version of I/O communication protocol under which the controller 220 is capable of operating. Accordingly, the processor 202 of the I/O device 200 accesses the previously unused portions of the next message from the controller 220 to the I/O device 200, determines the version of the protocol capable of being used by the controller 220, and configures itself to operate under the software version of the I/O communication protocol indicated by the next message, as shown in box 264. The version/functionality may be indicated within the previously-unused portion using, for example, one or more binary bits, where the binary value of the bit(s) corresponds to a particular version/functionality of an I/O communication protocol.

In another embodiment, the version of the I/O communication protocol may be communicated to I/O devices using specialized messages transmitted over the bus 206 after the I/O device is detected and initialized for operation. For example, after the controller 220 has detected the I/O device 200, and messages passed between the controller 220 and the I/O device 200 perform initialization of the I/O device 200, the controller may be programmed to generate a specialized message to the I/O device 200, for example a version identification message, to the I/O device 200, where the I/O device 200 is programmed for receiving the version identification message from the controller. The I/O device 200 determines the version of I/O communication protocol identified by the controller 220 in the version identification message, and configures to that version of I/O communication protocol.

In another embodiment, when the same version of I/O communication protocol used by the controller 220 is not stored in the I/O device 200, the I/O device may configure to a version of I/O communication protocol compatible with the version used by the controller 220. The compatible version of I/O communication protocol may be, for example, a more primitive version of I/O communication protocol than is used by the controller 220.

Figure 6:
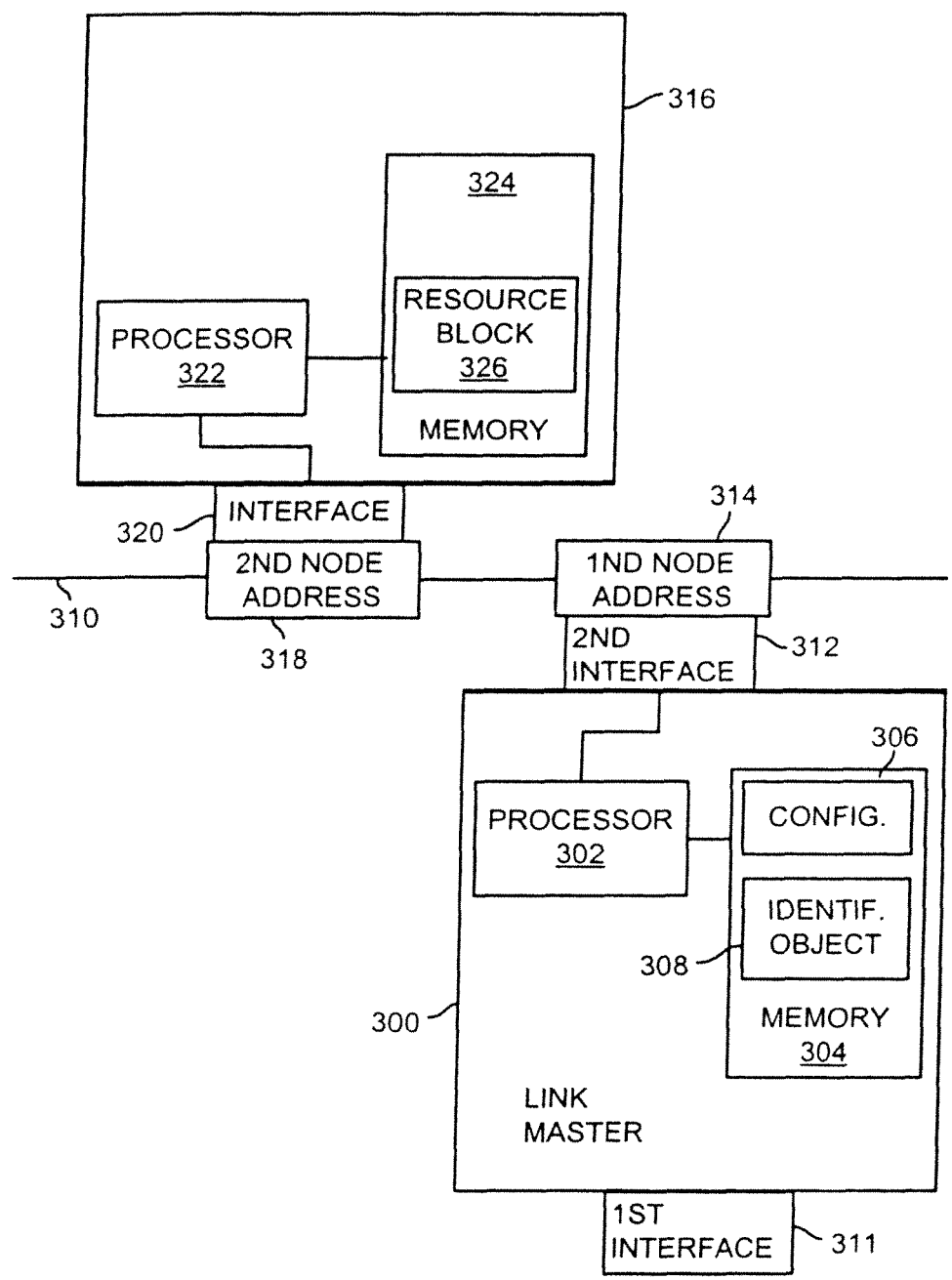
FIG. 6 is a schematic block diagram of an I/O device and a field device used in a process control system.

Further, the configuration capabilities discussed above may occur between an I/O device and a field device. Such a system is discussed with respect to FIG. 6, which illustrates a Fieldbus I/O device and field device on a bus segment. The Fieldbus I/O device 300 of FIG. 6 is used on a bus segment of a process control system utilizing the Fieldbus communication protocol. The I/O device 300 includes a processor 302 which controls operation of the I/O device 300 using software located within a memory 304 coupled to the processor 302. The memory 304 includes a configurer functionality 306 for configuring the bus segment of the process control system, and an identification object 308 for maintaining information regarding the I/O device 300 including software versions for the communication protocol utilized by/be I/O device for communicating to field devices connected thereto, here the Fieldbus protocol. The processor 302 is further coupled to a first interface 311 for interfacing the I/O device 300 with, for example a backplane (not shown) of the process control system, for example the backplane 111 of FIG. 1. The I/O device 300 is connected to a bus segment 310 via a second interface 312 at a first node address 314. The bus segment 310 is further connected to a field device 316 at a second node address 318 via an interface 320. The field device includes a processor 322 connected to the interface 320, which controls operation of the field device 316 utilizing software present within a memory 324. The memory 324 includes a resource block 326, where the resource block 326 includes device-specific data pertaining to some of the characteristics of the field device 316 including, for example, a device type, indications of where other device-specific information may be obtained within the memory, and the various versions of the communication protocol present within the memory 324. The I/O device 300 may be either of the Fieldbus I/O devices 120 or 122 of FIG. 1, which has configuration functionality (e.g., a linkmaster device). The bus 310 may be the bus segment 124 of FIG. 1, and the field device 316 may be any of the field devices 112, 113, 114 or 115 of FIG. 1.

Figure 7:
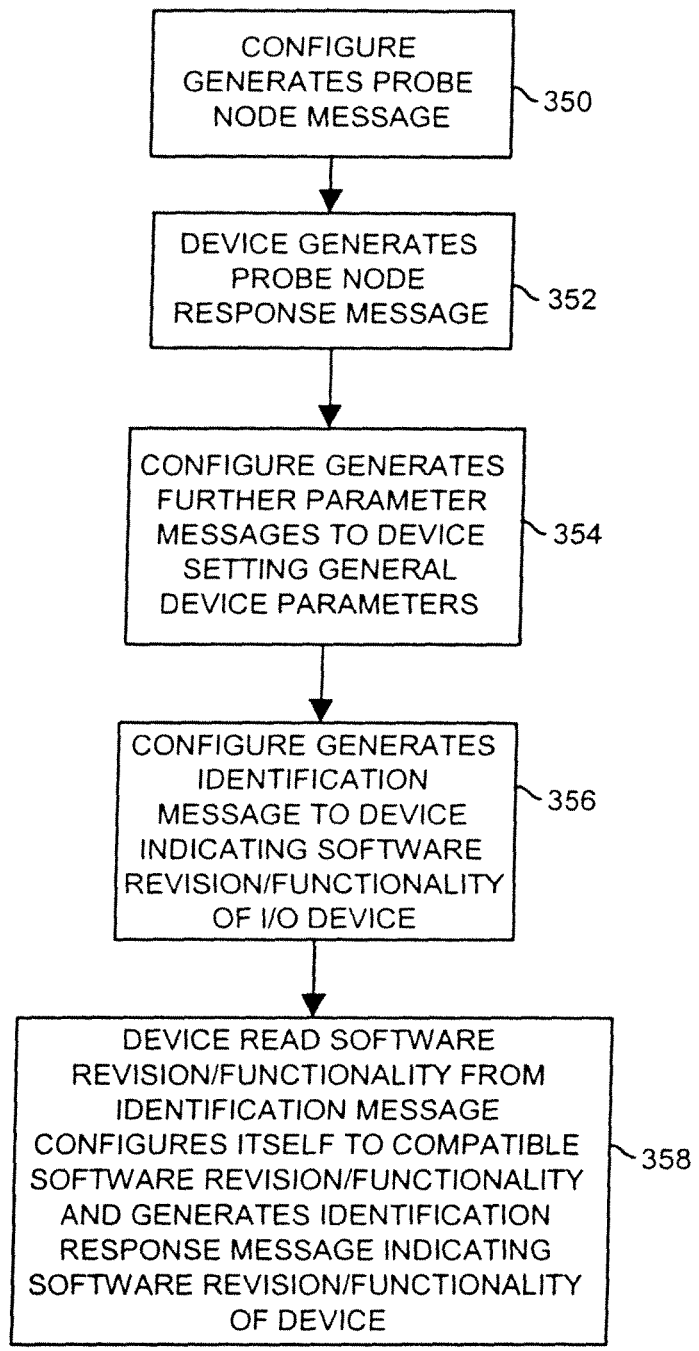
FIG. 7 is a flowchart illustrating operation of the I/O device of FIG. 6.

Operation of the I/O device 300 within the process control system, where the I/O device communicates with the field device 316 using a Fieldbus communication protocol is discussed with respect to FIG. 7. For the discussion of FIG. 7, it may be assumed that the field device 316 has just been added to the process control system to, for example, replace a faulty field device, or to provide the process control system with additional functionality as a field device which was not earlier present within the process control system. Alternatively, it may be assumed that the I/O device 300 is a replacement for a faulty I/O device having configuring capabilities, or an I/O device operating under a newer version of, for example the Fieldbus communication protocol, and must therefore probe the address nodes of the bus segment 310 to determine the field devices connected to the bus segment.

As shown in step 350, the configurer 306 of the device 300 generates a probe node message, where the probe node message is directed to the second node address 318, as would be appreciated by one skilled in the art. The field device 316 receives the probe node message and responds, where the processor 322 generates a probe node response message directed to the first node address 314, and therefore to the I/O device 300, step 352. The configurer 306 generates further parameter messages to the field device 316, step 354, which set general initial device operation parameters for the field device 316. Further, as shown in step 356, the configurer 306 generates a specialized message, for example, an identification message directed to the second node address 318 and thus the field device 316, where the identification message indicates the software version/functionality under which the I/O device 300 is capable of communicating over the bus segment 310. Upon receipt of the identification message, the field device 316 determines the software version/functionality from the identification message, step 358, and the processor 322 configures the field device 316 to operate under a compatible software version/functionality stored within the memory 324, similar to as discussed above with respect to step 264. Specifically, the processor 322 is sufficiently programmed for allowing the I/O device 316 to receive the identification message, and for retrieving the version/functionality information from a predetermined portion of the identification message. The processor 322 locates the particular portion of the memory 324 with functionality compatible to the identified version/functionality, and configures the field device 316 to operate using this functionality. The compatible functionality may be an identical version of the communication protocol (e.g. Fieldbus communication protocol) identified in the identification message, or alternatively may be a more primitive version where the memory 324 does not contain the identical version identified in the identification message. Further, the processor 322 of the field device 316 generates an identification response message including software version/functionality information of the field device 316, which may include the actual version of the communication protocol to which the field device 316 has been configured, where the identification response message is transmitted to the I/O device 300 over the bus 310.

The I/O devices 200 and field device 316 are capable of auto-configuration with the controller 220. Because the memory of the respective device includes a plurality of software versions for a particular I/O communications protocol, the I/O device 200 is capable of automatically configuring to the version of the I/O communication protocol used by the controller 220, and/or the field device is capable of configuring to the version of communication protocol used between the particular I/O device and field devices on a bus segment. Such configuration may occur when a new I/O device is added to the bus, or when a new controller is added to the bus. Similarly, such configuration may occur when a new field device is added to a bus segment, or when a new I/O device is added to the bus segment. Further, upon installation of a new controller (or I/O device) utilizing a newer version of the I/O communication protocol than the controller (or I/O device) being replaced, I/O devices connected to the bus (or field devices connected to the bus segment) are capable of automatically reconfiguring to the newer version of I/O communication protocol utilized by the controller (or replacement Fieldbus I/O device). Thus, device manufacturers need only produce and inventory one type of the specific I/O device, thereby reducing complexity of inventory systems and storage space required for maintaining devices for customers. Further, less information need be solicited from customers in order to provide a device compatible with the customer's process control system, thereby reducing chance of errors due to, for example, incorrect information provided by the customer or recorded by the device manufacturer employee, resulting in a greater success rate in getting the correct device to the customer. Additionally, because the memories of the I/O devices include numerous versions of the I/O communication protocol, the customers need not maintain a large inventory of devices compatible with various versions of the I/O communication protocol as replacement devices. Rather, the customer need only keep one type of a specific I/O device, as the one type includes multiple versions/functionality of the I/O communications protocol. Further, as the device is capable of automatically configuring to the version of an I/O communication protocol used by the controller or I/O device, overhead costs associated with configuring the I/O device are reduced for the customer, and errors due to improper device configuration are virtually eliminated, providing safer conditions for process control workers.

In some circumstances, a faulty I/O device connected to a bus, for example the backplane 111 of FIG. 1, prevents all other I/O devices on the bus from communicating with one another and with the controller. For example, the faulty I/O device may produce an undesirable signal on one or more of the bus lines common to all the I/O devices on the bus connecting the I/O devices with the controller. For example, a bus clock line, or an I/O device data transmit line of the bus may be held high by a faulty I/O device. The undesirable signal prohibits communication between all I/O devices and the controller on the bus, causing the bus and all I/O devices connected to the bus to go out of service. Such a condition may pose a danger to workers working near the process control system as process activities controlled by bus may be operating with limited or no control and/or monitoring. Thus, a need exists for an I/O device that when faulty, does not prevent I/O devices and the controller on the bus from communicating with the controller.

To help with these problems, an I/O device is provided for use in a process control system, including a plurality of I/O devices in communication with a controller via a bus. The I/O device has an interface for communicatively linking the I/O device with the bus, and a device processor coupled with the interface for controlling operation of the device including performing fault detection for the device. The device processor, upon detection of a potential device fault, severs the communication link provided by the interface with the bus. Having the device processor of the I/O device, upon detection of a device fault, causing the interface to sever the communication link between the I/O device and the bus allows faulty I/O devices to isolate themselves from the bus. This is especially advantageous as the safety of process control workers is improved because the faulty I/O device isolates itself from the bus. This functionality allows other devices connected to the bus to still communicate with the controller, providing better control and monitoring for processes controlled by that controller.

Figure 8:
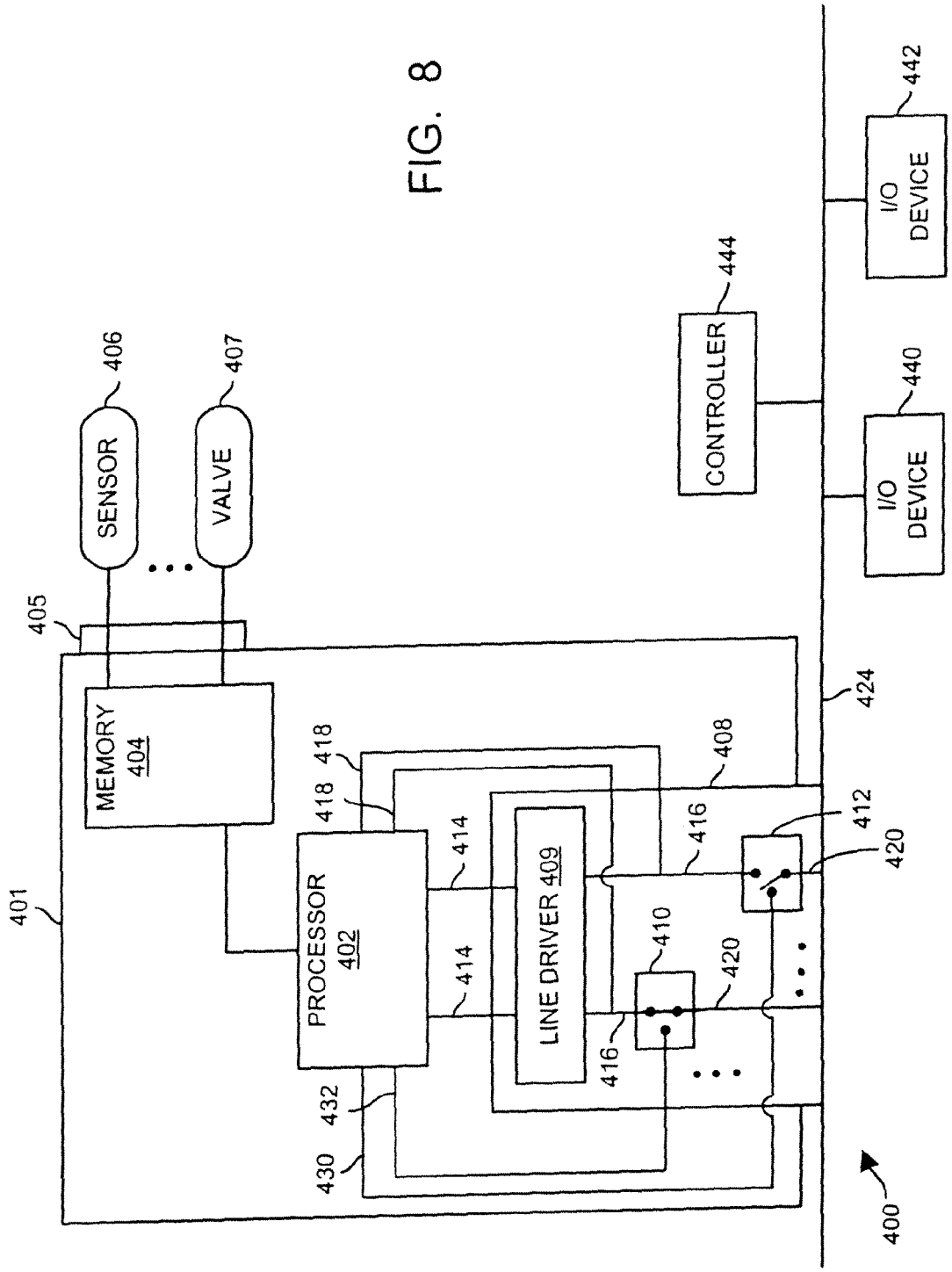
FIG. 8 is another schematic block diagram of a process control system having a controller and three I/O devices.

A process control system 400 including an I/O device 401 is illustrated in FIG. 8. The I/O device 401 includes a processor 402 for controlling operation of the I/O device. The processor 402 is coupled to the memory 404 which includes programming for the processor 402 that provides the I/O device 401 with functionality within the process control system. The I/O device 401, and specifically the functionality provided by the memory 404 may be used to control field devices such as a sensor 406 and a valve 407 through a field device interface 405.

The processor 402 is further coupled to an interface 408, including a line driver 409, which provides driving (for example, signal amplification) and buffering capabilities for the device 401, as would be appreciated by one skilled in the art. The line driver 409 is further coupled to one or more relays, for example relays 410, 412. Specifically, the processor 402 is coupled to the line driver 409 via one or more line driver input lines 414, and corresponding line driver output lines 416 couple the line driver to the relays 410, 412. Line driver output lines 416 are further coupled to the processor 402 via line driver output-read lines 418, allowing the processor 402 to read the state of the line driver output lines 416, as described below. Relay output lines 420 are coupled to a bus 424 for the process control system 400. The relays 410, 412 are controlled by the processor 402 via relay control lines 430, 432.

The relays 410, 412 have a first state, shown by the relay 410, which communicatively links the line driver output lines 416 to the relay output lines 420, and thus to the bus 424. The relays 410 and 412 also have a second state, shown by relay 412, which severs a communication link between the I/O device 401, and more specifically a particular data line, for example one of the line driver output lines 416 and the bus 424. The relays 410 and 412 are controlled by corresponding relay control lines 430, 432, where the processor 402 is capable of actuating the relays 410, 412 using the relay control lines 430, 432 to provide or sever the communication link between the line driver output lines 416 and the bus 424.

The bus 424 is further coupled to other devices, which may be for example other I/O devices 440 and 442, and a controller device 444 for controlling the I/O devices 401, 440 and 442. Communication between the controller 444 and the I/O devices 401, 440 and 442 may be accomplished using any I/O communication protocol, including proprietary communication protocols such as is included in the DeltaV software. Depending on the particular I/O communication protocol utilized by the process control system 400, the I/O devices 401, 440 and 442 may communicate with one another, or only with the controller 444. Further, depending on the particular I/O communication protocol utilized by the process control system 400, the bus 424 may include one data line, or a plurality of data lines for transferring information between the I/O devices 401, 440 and 442, and the controller 444, as would be appreciated by one skilled in the art.

For example, where the process control system 400 is a DeltaV system, the bus 424 typically includes three data lines: a transmit data line for transmitting information from the I/O device to the controller 444, a receive data line for receiving information into the I/O device from the controller 444, and a clock data line for providing synchronization between the devices 401, 440, 442 and 444 on the bus 424. Other I/O communication protocol may be utilized by the process control system 400, where the bus 424 may include two data lines, as would be appreciated by one skilled in the art, including for example a transmit data line used by the devices 401, 440, 442 and 444 to place information onto the bus 424, and a receive data line used by the devices 401, 440, 442 and 444 to read information from the bus. The line driver input lines 414, the corresponding line driver output lines 416 and relay output lines 420 are coupled to data lines of the bus 424 which the I/O device is capable of affecting. Affecting a data line of the bus may include, for example, forcing a state on the data line, such a logical "0" or a logical "1" as further discussed below. In the DeltaV process control system, the I/O device 401 is capable of affecting the transmit data line, and a clock data line. Thus, the lines 414 and relays 410, 412 correspond to the transmit data line and the clock data line of the bus 424. In other protocols using two-line busses, the I/O device 401 may be capable of affecting the transmit data line. Thus, a single line 414 and relay of the relays 410, 412 is necessary, which corresponds to a single transmit data line of the bus 424. The I/O device 401 in accordance with this embodiment is capable of severing communication with any of the data lines of the bus 424 which it is capable of affecting as will be discussed with respect to the flowchart of FIG. 9.

Figure 9:
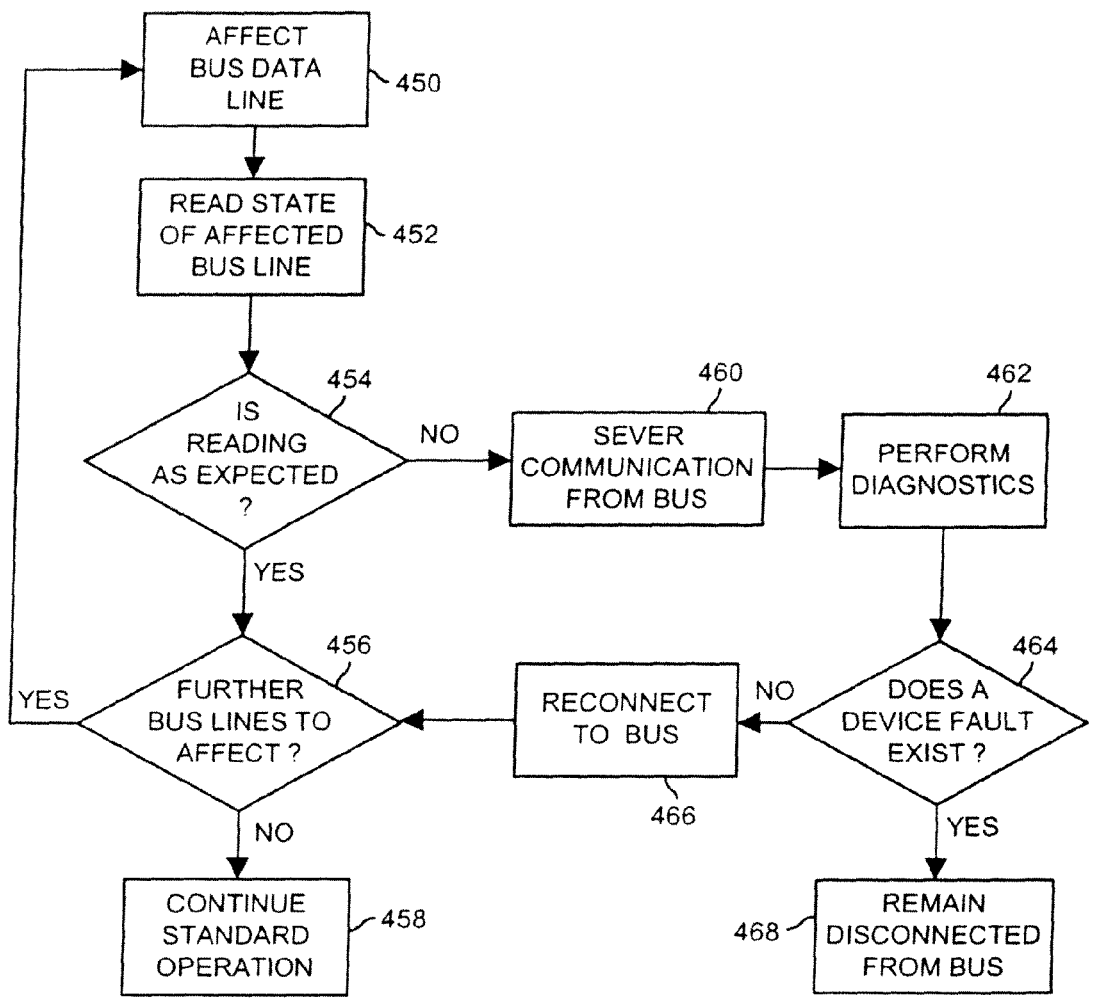
FIG. 9 is a flowchart illustrating operation of the process control system of FIG. 8.

FIG. 9 is a flow chart illustrating operation of the I/O device 401. In box 450, the processor 402 of the I/O device 401 sets the relays 410, 412 to the first state via control lines 430,432, thereby communicatively linking the I/O device 401 to the bus 424. The processor 402 then affects a data line of the bus 424. For example, the transmit data line and clock data line. Where the communication protocol utilizes synchronous and asynchronous communications within, for example a communication protocol operating using macro cycles, for example the Fieldbus communication protocol, the I/O device 401 affects the bus data line during an asynchronous communication time frame after its corresponding synchronous communication time frame within the macro cycle, as would be appreciated by one skilled in the art.

After affecting the data line in box 450, the processor 402 takes a reading of the effected bus line, step 452, using the corresponding line driver output-read lines 418. In box 454, the processor 402 determines whether the reading of the affected bus line is as expected. For example, where the processor 402 affected the particular bus line to change to a state of logical "1," the processor 402 determines in box 454 whether the affected bus line of the bus 424 indeed registers as a logical "1." Similarly, where the processor 402 affects the bus data line to change to a state of a logical "0," the processor 402 determines whether the affected bus line is in fact a logical "0." Where the reading is as expected in box 454, the processor 402 determines whether there are further bus lines which the I/O device 401 may affect, box 456.

When there are further bus lines to affect in box 456, the process returns to box 450 where the processor 402 affects another bus data line on the bus 424. However, when there are no further bus lines that the I/O device 401 may affect, the process control system 400 continues standard operation, box 458. Other devices may determine that all bus lines which may be affected by the I/O device 401 have been tested, and therefore the bus is available for use by the other devices. Alternatively, the I/O device 401 may send a diagnostic complete message to the other devices on the bus instructing the other devices that the device 401 is finished testing its connection with the bus 424.

Where the reading of the affected bus line is not as expected in box 454, the I/O device 401 severs its communication from the bus 424, as shown in box 460. Particularly, this may be accomplished where the I/O device 401 severs its link with the particular data line of the bus 424 being effected at that time using the corresponding relay control line 430,432 to place the corresponding relay 410, 412 in the second state. Alternatively, the processor 402 may utilize the relay control lines 430, 432 to cause all relays 410, 412 to be placed in the second state, thereby severing communication between the I/O device 401 and all bus data lines capable of being affected by the I/O device 401.

Figure 10:
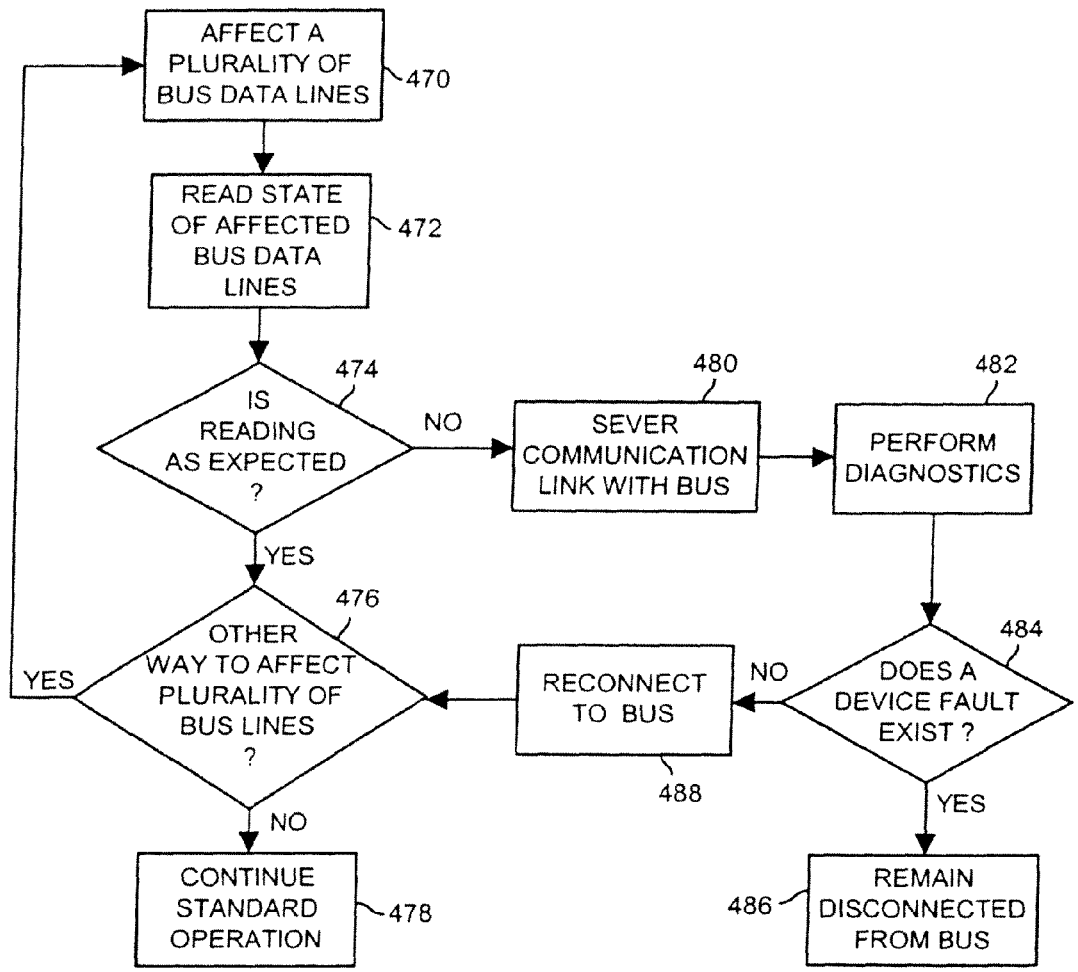
FIG. 10 is another flowchart illustrating operation of the process control system of FIG. 8.

After severing communications from the bus 424, the processor 402 performs diagnostics on the I/O device 401, box 462. For example, the diagnostics may be simply performing tests similar to the test of attempting to affect bus lines discussed above. However, as the effectible bus lines are no longer connected to the I/O device 401, the readings are taken from the affected line driver output lines 416 using the line driver output-read lines 418. These readings may be taken in a similar fashion as reading the affected bus lines discussed above in box 452. Of course, the processor 402 may perform any of the diagnostic routines stored in the memory 404 to determine if a problem with the I/O device 401 exists.

Where the processor 402 performing preprogrammed diagnostic tests determines that no problem exists with the I/O device 401, the processor 402 causes the relays 410, 412 via the relay control lines 430, 432 to reconnect communications between the I/O device 401 and the bus 424, box 466, and the process continues as shown in box 456, discussed above. However, where a fault is detected and the processor 402 determines that a device fault exists (box 464), the I/O device 401 remains disconnected from the bus 424, as shown in box 468. It will be apparent to one skilled in the art that desired diagnostics may be performed by the I/O device 401 that include testing the connections with bus lines effectible by the I/O device 401. Further, the diagnostics may include affecting the line driver output line(s) in multiple ways, where a reading is taken for each affecting attempt to determine if the I/O device 401 is functioning properly. FIG. 10 is another flowchart illustrating operation of the process control system 400 where multiple bus lines are affected.

Figure 12:
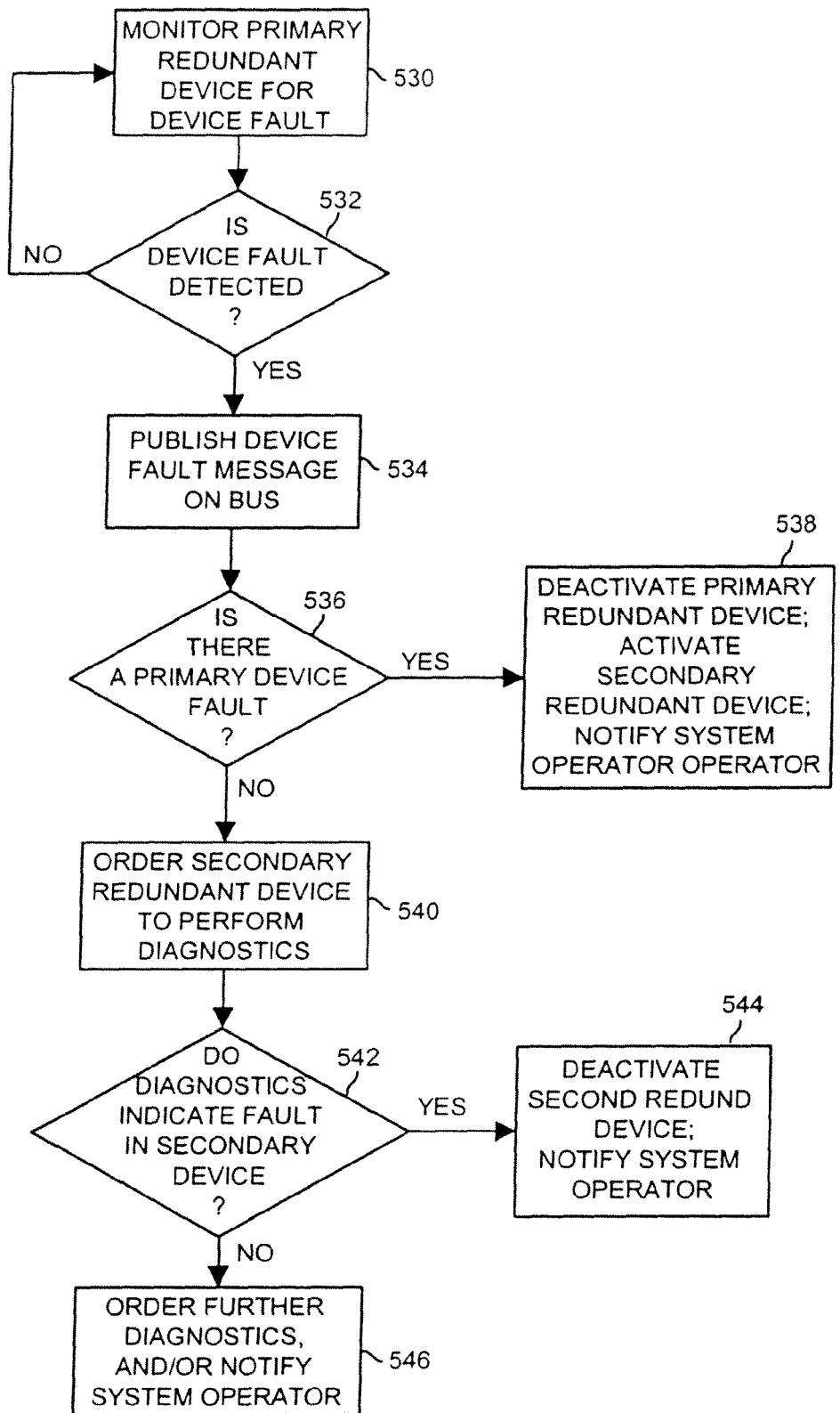
FIG. 12 is a flowchart illustrating operation of the process control system of FIG. 11.

As shown in box 470, the processor 402 affects multiple bus data lines, and reads the state of all affected bus data lines, box 472. For example, in a proprietary protocol, the processor 402 may cause both of the transmit data line and the clock data line of the bus 424 to be affected at the same time, by forcing a logical "0" and a logical "1" to respective transmit and clock data lines. The processor 402 then determines whether the readings are as expected, box 474. The processor 402 accomplishes this step in a similar fashion as discussed above in box 454.

Where the readings of the affected bus lines are as expected, the processor 402 determines whether there are other ways to affect the bus data lines, box 476. For example, the processor 402 may force a logical "1" and a logical "0" to the transmit and clock data lines, respectively, force a logical "0" to both of the transmit and clock data lines of the bus 424, and/or leave the transmit and clock data lines unaffected (when, for example pull-up resistors (not shown) on the relay output lines 420 pull the bus transmit and clock data lines up to logical "1"). When there are other ways to affect the bus lines, the process of FIG. 12 returns to box 470 and continues by affecting the bus lines in a different manner. However, when there are no other ways to affect the bus data lines, the I/O device 401 continues standard operation, box 478, similar to as discussed above with respect to box 458 of FIG. 9.

Where the readings of the affected bus lines are not as expected in box 474, the processor 402 severs communication from the bus 424, box 480 in a similar fashion as discussed in box 460 above using the relays 410, 412. The I/O device 401 then performs diagnostics, box 482. As discussed above with respect to box 462, because the device 401 is no longer connected to bus lines of the bus 424 that it is capable of affecting, attempts to affect the line driver output lines 416 or other diagnostic routines may be performed, where readings may be taken from the line driver output lines 416 via line driver output-read lines 418 or at any other location within the device 401. Further, the diagnostics may include affecting the line driver output lines in multiple ways, where a reading is taken for each affecting attempt to determine if the I/O device 401 is functioning properly. In box 484, the processor 402 determines whether a device fault exists. Where a device fault exists, the I/O device 401 remains unconnected from the bus 424, box 486. However, where the processor 402 determines that no device fault exists within the I/O device 401, the I/O device reconnects to the bus 424, box 488, in a similar fashion as discussed above in box 466 of FIG. 9, and the process proceeds to box 476 and continues as discussed above.

In a further embodiment, the I/O device is capable of testing the relays 410, 412 at predetermined times, by changing the operating state of the relays from the first state to the second state, and from the second state to the first state, to verify proper operation of the relays. Such testing may be performed at any time that the I/O device 401 is not transmitting or receiving information (e.g. messages) onto or from the bus 424.

In another embodiment not shown, the bus 424 may be a bus segment between a fieldbus I/O device, and a field device, for example the Fieldbus I/O devices 120 or 122, the bus segment 124, and any of the field devices 112-115 of FIG. 1. The Fieldbus protocol utilizes a two-wire bus for communicating between the Fieldbus I/O device and field devices connected thereto, where the field devices are capable of affecting only a transmit data line of the bus segment. One field device connected to the bus segment may affect or usurp the transmit data line of the bus segment, thereby preventing all other field devices from communicating with one another and with the Fieldbus I/O device. In this scenario, process activities controlled by that bus segment operate under limited or no control and/or monitoring by the process control system, posing a potentially dangerous situation for process control system workers.

A relay may be provided in the field device, controlled by a field device processor, thereby allowing the field device to sever its communication with the bus (or the transmit data line of the bus) when the field processor detects a potential or actual field device fault. The relay works in an analogous fashion as discussed above with respect to FIG. 9, in that upon detection of a potential field device fault, the field processor actuates the relay to sever communication between the field device and the bus segment, thereby allowing the other field devices and I/O device on the bus segment to once again communicate with one another if the field device has a fault that is detrimentally affecting the Fieldbus bus.

The line driver 409 and relays 410-412 have been described as being part of the interface 408. One skilled in the art will realize that the line driver 409 and relays 410-412 need not be part of the interface, but rather may be located anywhere within the I/O device 401, where the relays 410-412 are capable of severing communication with the bus 424.

Thus, where an I/O device is in fact affecting communications on the bus (or a field device affecting communications on a Fieldbus bus) and preventing other devices on the bus from communicating, the I/O device is capable of severing its communication with the bus. This allows the other devices on the bus to communicate. In this way, the process activities controlled by other I/O devices (or field devices) are once again monitored and/or controlled by the process control system, thereby increasing safety to process control workers.

The I/O device on a bus segment connects the controller to the hardware devices. Accordingly, a failure of the I/O device disrupts both the communications on the segment and the execution of process control until the I/O device is repaired or replaced. One alternative for minimizing the disruption to process control is to install on the segment a backup I/O device that is enabled when the primary I/O device becomes disabled. The pre-installed backup I/O device reduces the disruption by eliminating the necessity of either repairing the I/O device or removing the disabled I/O device and replacing it with a new I/O device. However, although the disruption is reduced, process control is still interrupted for a period of time. For instance, the failure of the I/O device must be detected so that the backup I/O device may be activated by a controller. Because multiple failed communication attempts are typically required before the controller orders diagnostics to be performed by an I/O device, it may take several seconds for a faulty I/O device to be detected by the controller. The backup I/O device is thus not activated to take control, and processes controlled by the faulty I/O device continue to operate under limited or no control/monitoring, posing a potentially dangerous situation to process control workers.

To help reduce this problem, a process control network having a plurality of devices includes a bus and a primary redundant device in communication with the bus. The primary redundant device may have a first unique address and is coupled to the bus. A secondary redundant device is also coupled to the bus, and may have a second unique address. The secondary redundant device is programmed to detect a primary redundant device fault via, for example, a dedicated connection line existing between the redundant pair of devices. The secondary redundant device, upon detecting the primary redundant device fault, places a primary redundant device fault message on the bus to notify the controller that the primary redundant device is potentially faulty. The primary redundant device fault message is received by the controller. Responsive to the primary redundant device fault message, the controller may order the primary redundant device to immediately perform a self-diagnostic. Alternatively, the controller may deactivate the primary redundant device and activate the secondary redundant device.

Providing the secondary redundant device with the capability of performing fault detection on the primary redundant device, and publishing a primary device fault message to the controller is advantageous because the controller for the process control system is more rapidly informed of a potential fault with the primary redundant device. As a result if a fault actually exists with the primary redundant device, the secondary (backup) I/O device is quickly activated to take control, so that processes controlled by the faulty I/O device continue to operate under the control and monitoring of the controller.

Figure 11:
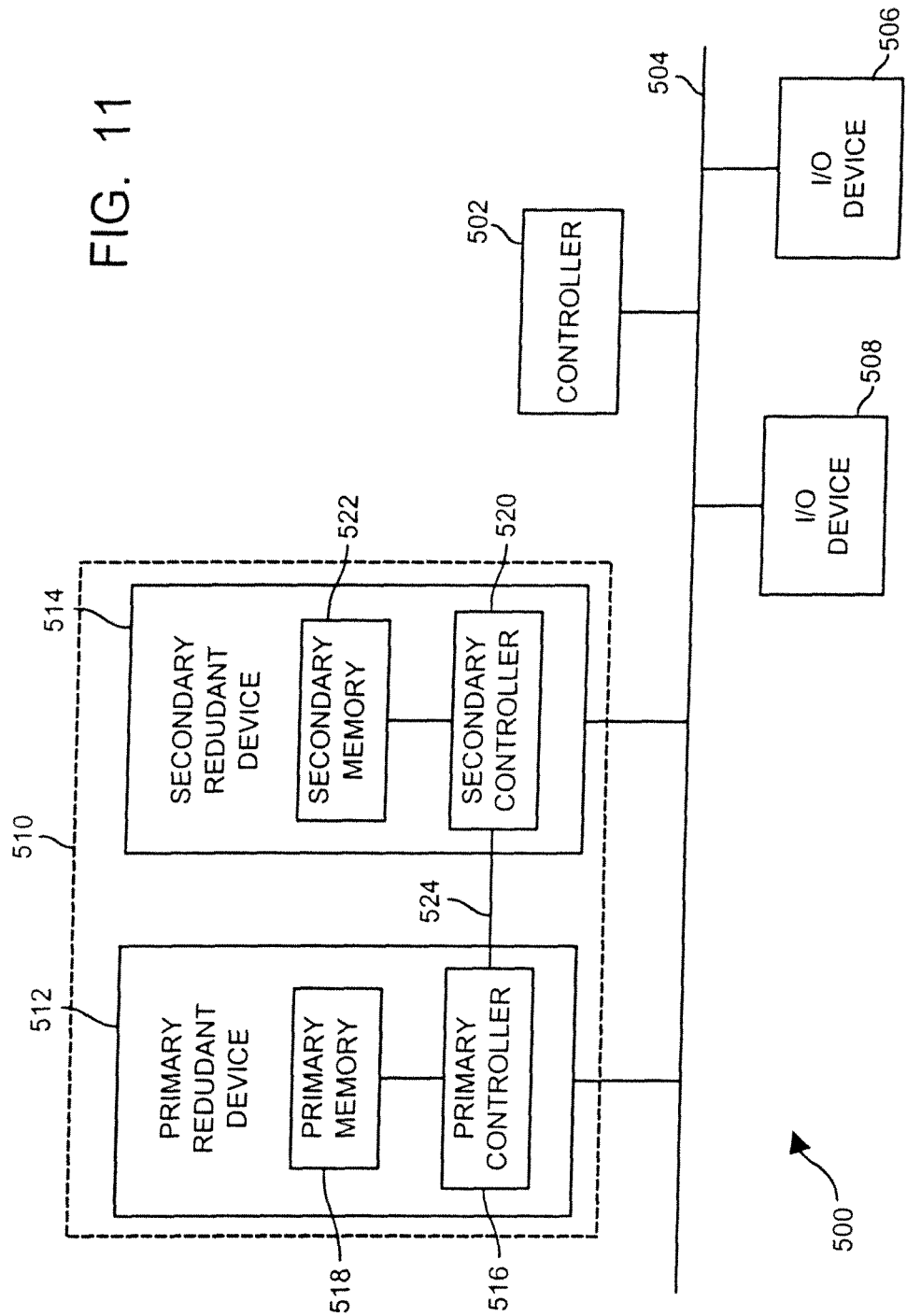
FIG. 11 is another schematic block diagram of a process control system having a controller coupled to redundant I/O devices.

A process control system 500 in accordance an embodiment of this aspect of this invention is illustrated in FIG. 11. A process control system 500 includes a controller 502 connected to a bus 504, which may be, for example, the backplane 111 of FIG. 1. I/O devices 506, 508, and primary and secondary redundant I/O devices 512 and 514 operating together within the process control system as device 515 are also connected to the bus 504. Each of the primary redundant device and the secondary redundant devices 512 and 514 are coupled to the bus 504. The primary redundant device 512 includes a primary processor 516 connected with a primary memory 518, which includes programming for controlling operation of the primary redundant device 512. The secondary redundant device 514 includes a secondary processor 520 connected to a secondary memory 522 for the secondary redundant device 514, where the secondary memory 522 stores programming executable by the secondary processor 520 for controlling operation of the secondary redundant device 514. The primary redundant device 512 is coupled with the secondary redundant device 514 via a dedicated communication link 524.

During normal operation of the process control system 500, one of the I/O devices 512 and 514 is actively sending and receiving messages on the bus segment 624, performing process control functions, and the like. For the purposes of the following discussion, the I/O device 512, which has previously been identified as the primary I/O device, is initially the active I/O device for the device 510. The I/O device that is not acting as the active I/O device for the device 510, in this case the secondary I/O device 514, is considered to be the backup I/O device for the device 510. While in the backup mode, the backup I/O device 514 does not perform any of the process control or communication functions of the device 510. However, the backup I/O device 514 may be configured to listen to the bus 504 for messages transmitted on the bus intended for the device 510. The backup I/O device 514 receives and decodes the messages, and stores any information from the messages that would normally be stored by the active I/O device 512. The backup I/O device 514 may even process information and update data stored therein, and execute any other functions that are necessary for the backup I/O device 514 to take over the process control functions of the virtual I/O device 512 if the active I/O device 512 becomes disabled or is otherwise taken out of service.

Communication between the controller and I/O devices may utilize a standard I/O communication protocol, or a proprietary I/O communication protocol such as is included within the DeltaV software. Further, communication between the I/O device and field devices connected thereto may utilize any communication protocol including the Fieldbus, HART, and Profibus communication protocols, etc. The dedicated communication link 524 may be a serial communication link between the primary redundant 512 and the secondary redundant device 514, or may comprise a plurality of data lines for performing parallel communication between the primary and redundant devices 512 and 514. More importantly, the dedicated communication link 524 may be any standard connection between the devices 512 and 514 over which the devices may communicate, such as the physical connection between the redundant devices 512 and 514, a direct hardwired connection between the devices 512 and 514, and the like. The redundant devices 512 and 514 may exchange any type of information that is necessary for the devices to function as redundant devices within the process control system 500.

The primary redundant device 512 may communicate with the secondary redundant device 514 at predetermined communication intervals, or in any other manner. Further, the communication occurring over the independent communication link 524 may be independent of any I/O communication protocol utilized by the process control system, provided that the primary and secondary redundant devices 512 and 514 are sufficiently programmed for communicating with one another over the dedicated communication link 524. Operation of the process control system 500 will be discussed with respect to the flowchart of FIG. 12.

In box 530, the secondary redundant device 514 monitors the primary redundant device 512 for primary redundant device fault. One way the secondary redundant device 514 may detect a primary redundant device fault is where the primary redundant device 512 does not timely transmit a message to the secondary redundant device 514 via the dedicated communication link 524.

In box 532, the secondary redundant device 514 determines whether or not a fault is detected with the primary redundant device 512. Where a fault or potential fault is detected with the primary redundant device 512, the secondary redundant device 514 sends a primary redundant device fault message on the bus 504, as shown in box 534. The primary redundant device fault message is received by, for example, the controller 502, thereby informing the controller 502 of a potential fault with the primary redundant device 512. The controller 502 may then determine whether there is, indeed, a primary redundant device fault, as shown in box 536. Such a determination may be made by the controller 502 ordering the primary redundant device 512 to perform self-diagnostics. The primary redundant device 512 publishes information on the bus 504 indicating the results of the self-diagnostic, and thus whether or not a primary redundant device fault exists.

Where it is determined that there is a primary redundant device fault in box 536, the controller 502 deactivates the primary redundant device 512, box 538, and activates the secondary redundant device 514. However, where the controller 502 determines that there is not a primary redundant device fault (box 536), the controller 502 may order the secondary redundant device 514 to perform self-diagnostics, step 540, because a false indication of a primary redundant device fault may indicate a fault in the secondary redundant device 514. The controller 502 then determines whether a device fault exists in the secondary redundant device 514, box 542. This determination is made in a similar fashion as with the primary redundant device, and the results of the self-diagnostic are published on the bus 504 by the secondary redundant device 514. Where a device fault exists in the secondary redundant device 514, the controller 502 may deactivate the secondary redundant device 514, and notify an operator of the process control system, as shown in box 544. However, where a device fault is not detected with the secondary redundant device 514, controller 502 may order further diagnostics on the primary redundant device 512, box 546, and/or may notify an operator of the process control system regarding the possibility of device faults with one or both of the primary and secondary redundant devices 512 and 514.

Having the secondary redundant device 514 which is capable of detecting device fault of the primary redundant device 512 provides the controller 502 with a more rapid determination of a fault with the primary redundant device 512, thereby allowing a secondary redundant device 514 to be activated in a manner faster than in process control systems of the prior art. Accordingly, processes controlled by a particular I/O device are thus controlled and/or monitored by the controller 502 without substantial disruption in control of the processes controlled by the process control system. Accordingly, process activities controlled by the redundant device pair continue to be controlled and monitored without substantial disruption.

In accordance with another embodiment, the redundant I/O devices are redundant Fieldbus I/O devices, and will be described with respect to the redundant Fieldbus I/O devices 120 and 122 of FIG. 1. For the purpose of this discussion, the primary redundant Fieldbus I/O device 120 is the active I/O device, and the secondary redundant Fieldbus I/O device 122 is the backup I/O device for the virtual device 130. The backup I/O device 122 maintains updated information as to the status of the processes for the virtual device 130, and is further capable of receiving messages published on the bus 124 by the active I/O device 120. The secondary device 122 may detect device faults in the active device 120. The I/O devices 120 and 122 may also have a direct communication link 159 through which the I/O devices 120 and 122 communicate with each other in a manner that is not necessarily dictated by the I/O communication protocol implemented on the bus segment 124 or backplane 111. The communication link 159 may be any standard connection between the I/O devices 120 and 122 over which the devices may communicate, such as the physical connection between the I/O devices 120 and 122 to the backbone of the bus, a direct hardwired connection between the devices 120 and 122, and the like. The I/O devices 120 and 122 may exchange any type of information that is necessary for the devices to function as redundant I/O devices and thereby implement the virtual I/O device 130 as described above. The information may include communications regarding which of the I/O devices 120 and 122 is the primary I/O device and which is the secondary I/O device, which device is the active device and which is the backup device, and updated information from the active I/O device that is necessary for the backup I/O device to take over as the active I/O device. Additionally, the I/O devices 120 and 122 may have function blocks that are used to implement process control, and the I/O devices 120 and 122 may exchange information for use by the function blocks to effect process control. The I/O devices may also exchange, at predetermined intervals, status information regarding the respective I/O devices 120 and 122.

The secondary Fieldbus I/O device 122 is capable of detecting a device fault based on information received or transmitted over the dedicated communication link 159. For example, where the primary I/O device 120 fails to communicate status information to the secondary I/O device 122 via the dedicated communication link 159 at the predetermined time, a possible device fault with the primary I/O device 120 is indicated.

Where the secondary redundant device 122 detects a possible primary redundant device fault, the secondary I/O device 122 publishes a specialized message on the Fieldbus bus 124, for example a primary redundant device fault message, to the controller 102. In response, the controller 102 orders the primary I/O device 102 to perform diagnostics. Upon detection of a device fault through the diagnostics, the controller 102 may deactivate the primary I/O device 120, and activate the secondary I/O device 122 to take control for the virtual device 130. For example, once the secondary I/O device 122 converts from backup mode to active mode, the I/O device 122 discontinues listening for messages containing the virtual publishing address for the virtual I/O device 130 and resumes the normal state activities such as responding to compel data commands and connection establishment messages.

However, where the diagnostics performed by the primary I/O device 120 do not indicate a device fault in the primary device, the controller may order the secondary I/O device 122 to perform self-diagnostics, as a false determination of a primary redundant device fault may indicate a fault in the secondary redundant device. Where the secondary I/O device 122 diagnostics indicate a device fault with the secondary I/O device 122, the controller 102 may cause the secondary I/O device 122 to be maintained in an inactive state, and indicate the device fault to a system operator for the process control system. However, where the secondary I/O device diagnostics do not indicate a device fault with the secondary I/O device 122, the controller 102 may notify the system operator of the process control system that potential device faults may exist in one or both of the primary and secondary I/O devices 120 and 122.

When the I/O devices 120 and 122 are installed in the process control network 100, the I/O devices 120 and 122 must know that they are a pair of redundant I/O devices, that one of the I/O devices 120 and 122 is the primary I/O device and the other is the secondary I/O device, and that one of the I/O devices 120 and 122 is the active I/O device and the other is the backup I/O device. One method for establishing the relationship between the I/O devices 120 and 122 is to exchange information between the I/O devices 120 and 122 via the communication link 159 described above. Another way to establish the relationship between the I/O devices 120 and 122 is for a user to program the I/O devices 120 and 122 directly, or to execute a programming routine at a host device or operator work station 104 that causes the programming of the I/O devices 120 and 122 via messages transmitted over the bus 110. Alternatively, the relationships between the I/O devices 120 and 122 and the other devices in the process control network 100 can be determined by the physical configuration of the devices and/or by the manner in which the I/O devices 120 and 122 are connected to the process control network 100, as discussed above.

Having the process control system where the secondary I/O device is capable of detecting a device fault of the primary I/O device is advantageous as the device fault is made known to the controller in a more rapid fashion than with process control systems of the prior art. As discussed above, prior art systems may not detect defective I/O devices until after multiple failed communication attempts, which may take several seconds. As the secondary redundant I/O device is typically activated by the controller, the secondary redundant I/O device is not activated for several seconds, thus leaving the processes controlled by the particular redundant I/O device pair virtually unmonitored and uncontrolled, posing a potentially dangerous condition for process control workers. In contrast, because the secondary I/O device is capable of detecting primary redundant I/O device faults, potential faults with the primary redundant I/O device are communicated to the controller in a more rapid fashion. Diagnostics are thus rapidly performed and activation of the secondary I/O device occurs with little or no interruption of the monitoring and/or control of the processes controlled by the particular redundant I/O device pair, thereby increasing safety for the process control workers.

The I/O devices and process control systems described herein have been described as being implemented in a process control network where communications between the I/O device and the controller utilize a DeltaV I/O communication protocol, and where communication between the I/O device and field devices connected thereto utilize the Fieldbus, HART and 4-20 mA communication protocols. However, it is noted that the I/O functionality described herein can be implemented using other types of programs, hardware, firmware, etc., associated with other types of control systems and/or I/O communication protocols. Further, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the I/O devices described and claimed herein can be implemented in process control networks that use other process control I/O communication protocols or schemes (that may now exist or that may be developed in the future) as long as these networks or protocols provide for or allow control functions to be performed at distributed locations within a process.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

We claim:

1. A field device for use in a process control system, the process control system including an I/O device and a plurality of field devices in communication with the I/O device using a bus segment having at least one data line, the field device comprising:
    a field interface for communicatively linking the field device with the bus segment; and
    a field device processor coupled with the field interface for controlling operation of the field device including performing fault detection for the field device;
    wherein the field device processor is configured to;
    attempt to affect one or more of the at least one data line of the bus segment;
    use the field interface to take a reading of the one or more data lines of the bus segment to determine whether the field device processor affected the one or more data lines of the bus segment;
    detect a potential field device fault when the reading taken of the one or more data lines of the bus segment indicates that the field device processor did not affect the one or more data lines of the bus segment; and
    upon detection of the potential field device fault, sever the communication link provided by the field interface with the bus segment prior to concluding that the field device is faulty.

2. The field device of claim 1 wherein the field device further comprises a relay device coupled between the field device processor and one of the at least one data line of the bus segment, the relay device having a first state communicatively linking the field device with the one data line of the bus segment, and a second state severing the communicative link between the field device and the one data line of the bus segment, wherein the field device processor, upon detection of the potential field device fault, is configured to sever the communication link with the bus segment by actuating the relay device to the second state.

3. The field device of claim 1 wherein the field device processor is configured to perform further fault detection upon severing of the communication link, wherein when the field device processor detects no field device fault from the further fault detection, the field device processor is configured to reestablish the communication link with the bus segment.

4. The field device of claim 2, wherein the field device processor is configured to actuate the relay device from the first state to the second state and from the second state to the first state, when the field device is not transmitting data onto or receiving data from the bus segment, so as to verify proper operation of the relay device.

5. A method for severing communication between a field device and a bus segment in a process control system, the process control system including an I/O device and a plurality of field devices in communication with the I/O device using the bus segment, the method comprising:
    communicatively linking the field device with the bus segment using a field interface of the field device; and
    controlling operation of the field device with a field device processor coupled to the field interface, including performing fault detection for the field device by;
    attempting to affect one or more data lines of the bus segment;
    using the field interface to read the one or more data lines of the bus segment;
    determining, based on reading the one or more data lines of the bus segment, whether the field device processor affected the one or more data lines of the bus segment;
    detecting a potential field device fault when reading the one or more data lines of the bus segment indicates that the field device processor did not affect the one or more data lines of the bus segment; and
    severing the communication link with the bus segment upon detecting the potential field device fault prior to concluding that the field device is faulty.

6. The method of claim 5, wherein severing the communication link with the bus segment upon detecting the potential field device fault comprises actuating a relay device of the field device from a first state that communicatively links the field device with one of the one or more data lines of the bus segment to a second state that severs the communicative link between the field device and the one data line of the bus segment.

7. The method of claim 5, wherein severing the communication link with the bus segment upon detecting the potential field device fault is performed by actuating a relay device of the field device, the method further comprising verifying proper operation of the relay device by actuating the relay device from a first state to a second state and from the second state to the first state when the field device is not transmitting data onto or receiving data from the bus segment.

8. The method of claim 5, further comprising:
performing further fault detection upon severing the communication link with the bus segment; and
reestablishing the communication link with the bus segment when the field device processor detects no field device fault from the further fault detection.

9. A process control system comprising:
a process controller;
an I/O device communicatively coupled to the process controller; and
a plurality of field devices in communication with the I/O device using a bus segment, each of one or more of the plurality of field devices comprising;
a field interface for communicatively linking the field device with the bus segment; and
a field device processor coupled with the field interface for controlling operation of the field device including performing fault detection for the field device;
wherein the field device processor is configured to;
attempt to affect one or more data lines of the bus segment;
use the field interface to take a reading of the one or more data lines of the bus segment to determine whether the field device processor affected the one or more data lines of the bus segment;
detect a potential field device fault when the reading taken of the one or more data lines of the bus segment indicates that the field device processor did not affect the one or more data lines of the bus segment; and
upon detection of the potential field device fault, sever the communication link provided by the field interface with the bus segment prior to concluding that the field device is faulty.

10. The process control system of claim 9, wherein each of the one or more of the plurality of field devices further comprises a relay device coupled between the field device processor and one of the one or more data lines of the bus segment, the relay device having a first state communicatively linking the field device with the one data line of the bus segment, and a second state severing the communicative link between the field device and the one data line of the bus segment, wherein the field device processor, upon detection of the potential field device fault, is configured to sever the communication link with the bus segment by actuating the relay device to the second state.

11. The process control system of claim 10, wherein for each of the one or more of the plurality of field devices, the field device processor is configured to actuate the relay device from the first state to the second state and from the second state to the first state, when the field device is not transmitting data onto or receiving data from the bus segment, so as to verify proper operation of the relay device.

12. The process control system of claim 9, wherein for each of the one or more of the plurality of field devices, the field device processor is configured to perform further fault detection upon severing of the communication link, wherein when the field device processor detects no field device fault from the further fault detection, the field device processor is configured to reestablish the communication link with the bus segment.

* * * * *